Dec. 12, 1972  J. A. GINGRICH  3,706,017
MOTOR SPEED CONTROL
Filed July 15, 1970  8 Sheets-Sheet 1

INVENTOR.
JOHN A. GINGRICH
BY
Brumbaugh, Graves, Donohue
& Raymond
his ATTORNEYS Dec. 12, 1972  J. A. GINGRICH  3,706,017
MOTOR SPEED CONTROL
Filed July 15. 1970  8 Sheets-Sheet 2

INVENTOR.
JOHN A. GINGRICH
BY
Brumbaugh, Graves, Donohue & Raymond
his ATTORNEYS

INVENTOR.
JOHN A. GINGRICH

INVENTOR.
JOHN A. GINGRICH

Dec. 12, 1972   J. A. GINGRICH   3,706,017
MOTOR SPEED CONTROL
Filed July 15, 1970   8 Sheets-Sheet 6

INVENTOR.
JOHN A. GINGRICH
BY Brumbaugh, Graves,
Donohue & Raymond
his ATTORNEYS

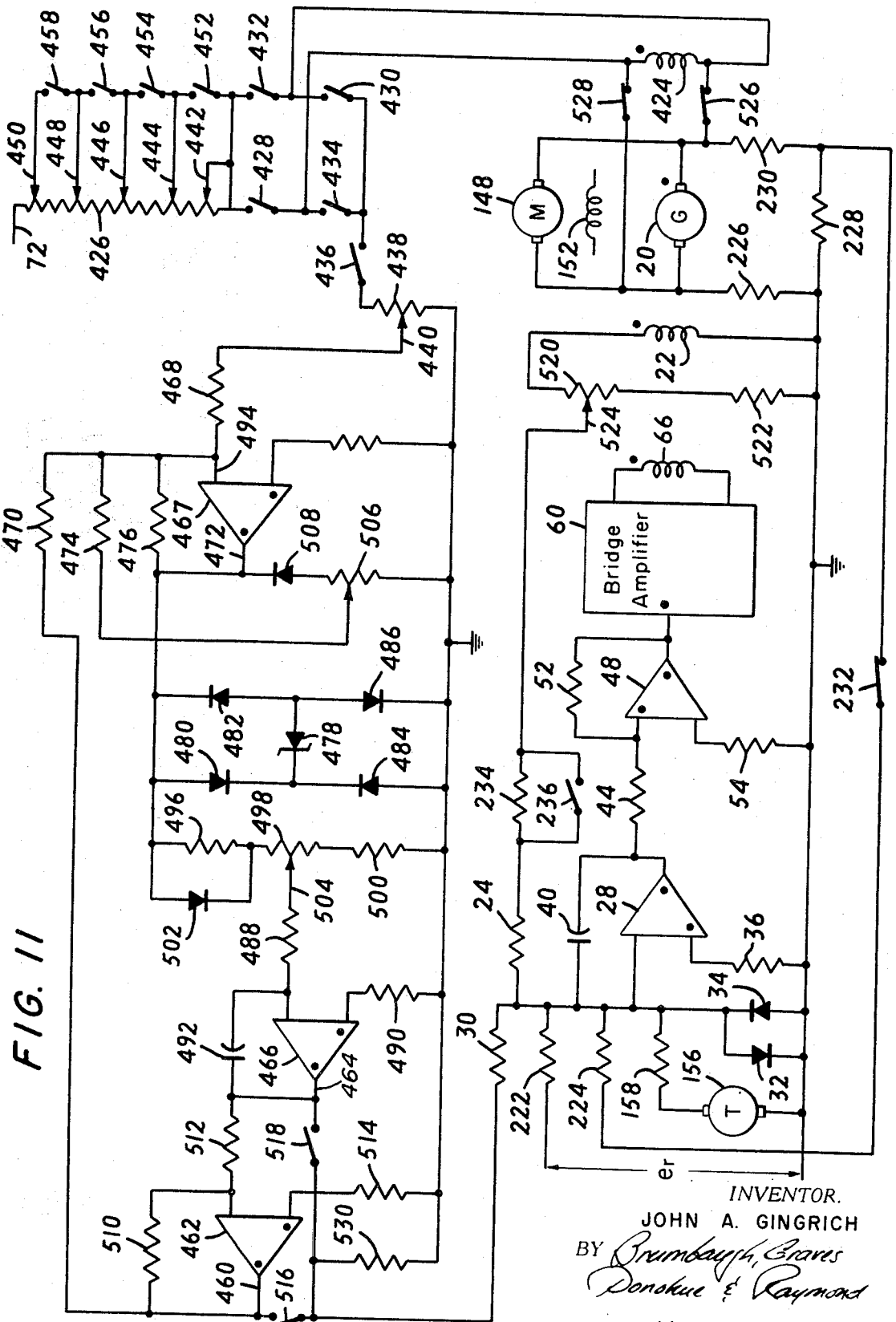

Dec. 12, 1972    J. A. GINGRICH    3,706,017
MOTOR SPEED CONTROL

Filed July 15, 1970    8 Sheets-Sheet 8

INVENTOR.
JOHN A. GINGRICH
BY Brumbaugh, Graves,
Donohue & Raymond
his ATTORNEYS

United States Patent Office 3,706,017
Patented Dec. 12, 1972

3,706,017
MOTOR SPEED CONTROL
John A. Gingrich, Toronto, Ontario, Canada, assignor to Dover Corporation (Canada) Limited, Toronto, Ontario, Canada
Filed July 15, 1970, Ser. No. 54,895
Int. Cl. H02p 7/34
U.S. Cl. 318—146
18 Claims

ABSTRACT OF THE DISCLOSURE

A system for accurately controlling the speed of a D.C. motor which is powered by the generator of a motor-generator set. The flux in the generator is controlled by a generator field supplied by a switching bridge amplifier. The voltage induced in an extra generator field is integrated to obtain a measurement of the change of the flux in the generator and this measurement is used to control the switching of the bridge amplifier. The control is effected in such a way that the rate of change of flux in the generator is made proportional to the error between the pattern speed and the measured speed of the D.C. motor.

BACKGROUND OF THE INVENTION

The present invention relates to vehicular speed control systems where a D.C. motor is driven by a variable voltage obtained from a motor-generator set. Such systems are particularly useful where the D.C. motor is alternately employed as a brake as well as a drive, such as occurs in a counterweighted elevator installation. The motor is used to brake the elevator when the weight of the descending counterweight exceeds the weight of the ascending car, or when the descending car is heavier than the ascending counterweight.

Precise control of the speed of a D.C. motor in such a system is made difficult by the hysteresis and saturation of the generator magnetic circuit, and by changes of resistance due to temperature in the motor and generator fields and armatures. Were it not for those difficulties, the speed would be exactly proportional to the current in the shunt field of the generator, provided that a series field on the generator were adjusted to the correct value to compensate exactly for the resistance of the armatures and their connecting wires.

However, because of these difficulties, it is generally necessary to use some form of feedback loop to get the accurate control of speed demanded by passenger elevator installations where fast, accurate and smooth performance is required. Conventional feedback loops have been developed for comparing the actual speed with a pattern speed, and for controlling the generator field by some form of amplifier so that any error between pattern and actual speed is reduced to a small value. Generally, such systems are not entirely satisfactory for elevator installations.

One demanding requirement of an elevator installation which is not usually met by conventional feedback systems, is that of bringing the motor speed down to zero, and of holding the motor stationary for a brief period until the brake has had time to fully apply. This must be done over the full load range from no load on the car, to full load. If the motor is still moving slightly, when the brake is applied, an objectionable bump occurs.

Conventional feedback systems require a compromise with regard to the amount of damping; if the system is sufficiently damped to prevent overshooting an oscillation, it may be too sluggish in forcing the speed to assume a new value dictated by the pattern; if the system is not damped sufficiently, the speed will overshoot and perhaps oscillate briefly when a new value of pattern occurs. Also, in order to reduce hunting or overshooting of the speed, a steady state error may have to be permitted. Systems which attempt to eliminate the steady state error are generally prone to oscillatory difficulties.

Much of the difficulty in conventional feedback loops is due to the delay between a change in voltage applied to the generator field, and the resulting change in speed. By the time the speed change is detected, it is too late to do anything further to the generator field, and the speed will change beyond the amount desired. Part of this delay is due to the inductance of the generator field; the flux in the generator, and hence the generator voltage changes exponentially when an abrupt change of voltage occurs on the field. The remaining delay is caused principally by the mass of the moving parts of the system, including the inertia of the rotating parts such as the motor. In order to change the speed, the generator voltage must differ from the motor armature voltage by a sufficient amount to cause the necessary current to flow to develop an accelerating or decelerating torque on the motor. The armature inductance also contributes to the delay, but its effect is small in comparison with the two causes mentioned above.

SUMMARY OF THE INVENTION

It is therefore an object of the present invention to provide a feedback system for controlling the speed of a generator-powered D.C. motor in which the magnetic flux in the generator is indirectly determined, and thus controlled with negligible delay, so that the difficulties due to delay between generator field voltage, and flux are eliminated.

A further object of this invention is to provide a feedback system for controlling the speed of a generator-powered motor in which the resistance of the generator and motor armatures, which otherwise causes delay and errors, is used to advantage to obtain smoothness and stability.

Another object of the invention is to provide a feedback system for controlling the speed of a generator-powered motor which is capable of causing smooth, stepless acceleration of the motor at any prescribed rate.

A further object is to provide a feedback system for controlling the speed of a generator-powered motor which is capable of bringing the motor speed down to zero, and holding it at zero for several seconds, without use of a friction brake, under all normal load conditions.

These objects, as well as other objects which will become apparent in the discussion that follows, are achieved, according to the present invention, by providing a feedback system which causes the rate of change of flux in the generator to be proportional to the error between the pattern speed and the measured speed of the motor.

In a preferred embodiment of the feedback system according to the invention, the flux in the generator is controlled by a generator field supplied by a switching bridge amplifier. The voltage induced in an extra generator field is integrated to obtain an indirect measurement of the net change in flux in the generator and this measurement is used to control the switching of the bridge amplifier. In particular, the integration is performed on the sum of the speed error and the voltage induced in the extra generator field, and the bridge amplifier is switched when the output of the integrator exceeds a predetermined positive or negative limit.

In a generator driven at constant speed, the generated voltage is directly proportional to the flux. On any field winding on the generator, the voltage induced in it is a measure of the rate of change of the flux; this voltage is directly proportional to the number of turns on the field, and to the time rate of change of the flux. Thus, integration of the voltage induced in a field of the generator indicates the net amount of change in flux, and this in turn, is proportional to the net change in generated voltage. This generated voltage is directly measurable only if no armature current is flowing; otherwise, the voltage drop in the armature causes the terminal voltage of the generator to differ from the internally generated voltage. Thus, integration of the voltage induced in a field on the generator can provide an indirect measurement of any change in either flux or generated voltage.

In the preferred embodiment of the present invention an extra field is provided on the generator for the purpose of measuring the flux changes. Frequently, such a field is available on generators; if not, the series field may be used for this purpose since it is not required in the normal way. The voltage induced in the series field is small, but still sufficient. A higher voltage can be obtained by replacing the series field with a winding of fine wire, with many more turns. Since this winding is not used to excite the field, and since the voltage induced in it feeds into a high resistance, the current is very small and thus very fine wire may be used, if space is limited in the generator.

In any feedback system, an amplifier is required. For the present invention, an amplifier is required to control the shunt field on the generator. The amplifier need not supply the entire excitation, however; typically, it will supply about one-half of the total excitation, and the remaining half will be obtained by normal means, through contacts and resistors, or by self-excitation. The entire excitation could, if desired, be entirely supplied by the amplifier.

For this invention, a switching bridge amplifier is particularly suitable. Such an amplifier is described in the U.S. patent application Ser. No. 656,758, filed July 28, 1967, and in the Canadian patent application No. 025,742, filed July 23, 1968, both in the name of Demetre Iordanidis. This amplifier uses switching, rather than linear operation, in order to minimize the heat dissipated in the transistors. Four main power transistors are used in a bridge circuit and only two conditions are used: full output voltage of one polarity; or full output voltage of the opposite polarity. The average output voltage can be varied by controlling the ratio of dwell times in the two conditions. Full reversible control of the output voltage is thus obtained. The frequency of switching can be considerably higher than line frequency, if desired; amplifiers employing silicon controlled rectifiers are normally restricted to operation at line frequency.

The switching bridge amplifier is particularly suitable for this invention because it functions best when supplying an inductive load, such as a generator field, and also because it can induce an A.C. voltage, roughly a square wave, into the extra generator field. This A.C. voltage is very convenient for integration between two fixed limits, and also serves to sustain the oscillations of the system at a controlled frequency determined by the integrator.

Basically, the signal obtained from the extra generator field is integrated, and when the output of the integrator has reached one limit, such as for example, plus 7 volts, the bridge amplifier is reversed, and the voltage induced in the extra field reverses. This condition continues until the output of the integrator has reached the other limit, for example, minus 7 volts; then the bridge amplifier switches back to the original conditions.

This action repeats at a frequency of, typically, between 200 and 500 hertz. Between reversals, the flux in the generator has changed by a very small, but definite amount. The flux tends to increase and decrease by almost exactly the same amount each time, the accuracy of the amount being dependent upon the precision of the integrator. Thus, the average flux remains substantially constant, but with a very small high frequency ripple.

As mentioned, the accuracy of control depends upon the precision of the integrator; with commercially available operational amplifiers, it is possible to easily obtain typical drift rates as low as 2% of maximum flux per minute. More precision can be obtained by various methods, but is generally not required.

By applying a D.C. voltage, through a resistor, to the input of the integrator so that it sums this voltage with the voltage induced in the extra generator field, it is possible to make the generator flux change at a controlled rate instead of holding it constant.

In this mode of operation, the D.C. voltage adds to the induced voltage for one polarity of the bridge amplifier, and subtracts for the opposite polarity. Thus, the output of the integrator swings more rapidly in one direction than the other, but still operates between the same two limits. As a result, the flux in the generator is changed more in one direction than the other so that after each cycle, it differs from the previous cycle by a fixed amount.

This type of operation is also quite accurate, and the flux can be caused to increase very linearly with respect to time regardless of the hysteresis or saturation of the generator, regardless of the changes in resistance of the generator fields due to temperature, and regardless of any variations in the line voltage.

Thus, the rate of change of flux, and hence the rate of change of internal generator voltage can be accurately controlled by an extra input to the integrator. The delay between the changing of this input and the commencement of the flux changing is at most one cycle; at 500 Hz., one cycle takes only 2 milliseconds.

If the flux is caused to increase from zero at a controlled rate, smooth, stepless acceleration of the motor can be obtained. By making the flux rate of change proportional to the velocity error, accurate, stable, smooth control of speed is possible. These advantages will be further explained in the description that follows, of the preferred embodiments of the present invention.

BRIEF DESCRIPTION OF THE DRAWINGS

FIG. 11 is a schematic drawing showing an alternative circuit for producing a speed pattern.

DESCRIPTION OF THE PREFERRED EMBODIMENTS

The preferred embodiments of the present invention will now be described with reference to FIGS. 1-16 of the drawings.

Figure 1:
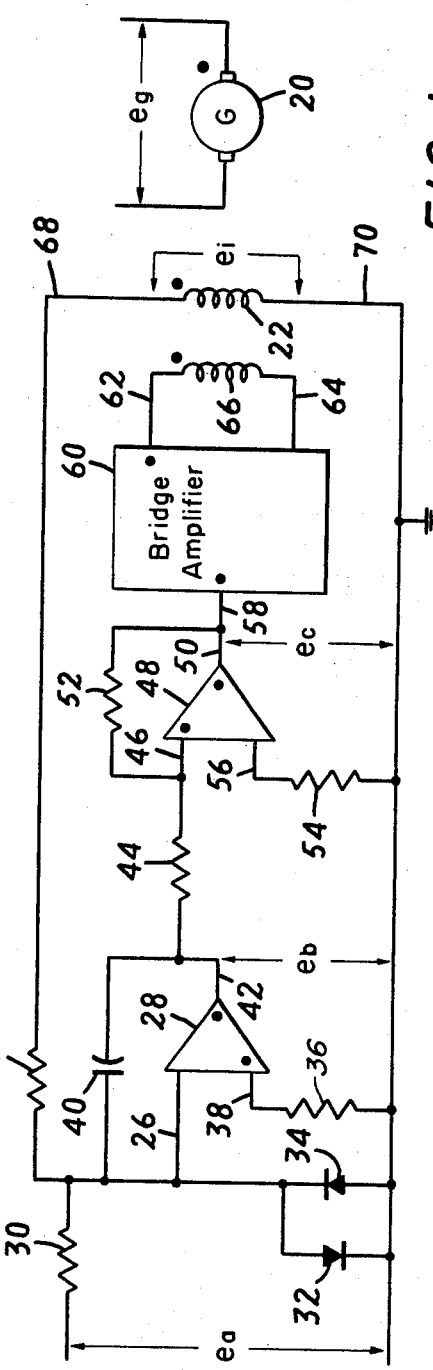
FIG. 1 is a schematic drawing of a portion of the feedback circuit, according to the present invention, for measuring and controlling the generator flux.

In FIG. 1, there is shown a generator armature 20 connected in open circuit, so that the voltage $e_g$ generated in the armature is the same as the terminal voltage. It is assumed that the generator armature is rotated by a suitable prime mover, such as the induction motor of a motor-generator set, at a substantially constant speed.

An extra field 22 is shown, and the voltage $e_i$ induced in it is applied through resistor 24 to the inverting input 26 of an operational amplifier 28. A further resistor 30, which is also connected to the inverting input 26 of the amplifier 28, has a voltage $e_a$ applied to it from some other source, not shown in FIG. 1.

Two diodes 32 and 34 are used to protect the operational amplifier from damage due to excessive voltage, from either $e_a$ or $e_i$. Normally, the voltage between input 26 of the amplifier and ground is much lower than the forward drop of the diodes, and thus no appreciable current flows through them.

A resistor 36, whose value should ideally be equal to the parallel resistance of resistors 24 and 30, connects the other input 38 of the amplifier to ground. This is in accordance with accepted practice for operational amplifiers to minimize errors due to the "zero offset current" of the device.

A capacitor 40, connected between the amplifier output 42 and the inverting input 26 causes the operational amplifier 28 to operate as an integrator. The output voltage $e_b$ should then be always proportional to the time integral of the algebraic sum of input voltages $e_a$ and $e_i$, taking into account the relative scale factors determined by resistors 24 and 30. In a typical case, where the resistors 24 and 30 take the values 150K and 27K, respectively, $e_a$ will have a greater effect, by the ratio 150/27, than $e_i$. This is simply to allow $e_a$ to control the integration from a low voltage supply, while $e_i$ normally has higher values.

The output 42 of the amplifier 28 is applied through resistor 44 to the non-inverting input 46 of a second operational amplifier 48. The output 50 of the amplifier 48 is connected through resistor 52 to the input 46. A resistor 54, which ideally should be equal to the parallel resistance of the resistors 44 and 52, connects the inverting input 56 of the amplifier 48 to ground.

In normal operation, the output voltage $e_c$ of amplifier 48 is positive when voltage $e_b$ is going from positive to negative; the actual voltage of $e_c$ is determined by the supply voltage to the operational amplifiers and the load presented by the input 58 to the bridge amplifier. For explanation purposes, this voltage is assumed to be 10 volts.

Then, the 10 volts cause 1 ma. of current to flow through resistor 52 into input 46 of the amplifier 48. When the voltage $e_b$ exceeds about 6.8 volts negative, the current through resistor 44 exceeds 1 ma., but in the opposite direction, and thus the $e_b$ voltage predominates over the $e_c$ voltage and the output of amplifier 48 changes from plus 10 volts to minus 10 volts.

This change of $e_c$ from plus 10 to minus 10 causes the output of the bridge amplifier 60 to reverse, so that now the output 62 will be negative, and the output 64 positive. This change reverses the voltage on the generator field 66, and also reverses the voltage induced in the extra field 22 so that voltage $e_i$, now opposite in polarity, causes the integrator comprised of the amplifier 28, resistors 24, 30 and 36 and capacitor 40 to swing its output from negative to positive.

When it exceeds approximately 6.8 volts positive, the integrator output voltage $e_b$ will again cause more than 1 ma. to flow through the resistor 44, exceeding the 1 ma. flowing out through resistor 52, thus changing again the output of the amplifier 48.

The purpose of operational amplifier 48, therefore, is to detect when the output voltage $e_b$ from the integrator has reached either one of the two limits, and to initiate reversal of the bridge amplifier output when either limit is reached.

Waveforms are shown in FIG. 2 for voltages $e_i$, $e_b$ and $e_c$ and for the flux $\phi$, for the case where the voltage $e_a$ is zero and where the flux $\phi$ has a substantial value. Just prior to time $t_1$, the flux decreases toward the value $\phi_1$, and induces a negative voltage on the output 68 of field 22, making $e_i$ negative (the output 70 of the field 22 is connected to ground). The voltage $e_b$ therefore rises and approaches the plus 6.8 volt level. In order to produce this polarity on the field 22, output 62 of the bridge amplifier 60 must be the same polarity as the output 68, and therefore negative. This requires that the input 58 to the bridge amplifier 60 and, thus, the output 50 of the amplifier 48, voltage $e_c$, be negative also.

At time $t_1$, the voltage $e_b$ reaches plus 6.8 volts. The operational amplifier 48, therefore reverses the polarity of $e_c$ from minus 10 to plus 10 volts, as described previously. This causes the bridge amplifier to reverse its polarity, and thus the flux starts to increase at time $t_1$. At the instant of reversal, the flux is at a value $\phi_1$. Thereafter it rises along a portion of an exponential curve for reasons which will be discussed in further detail below. Since the flux has a substantial positive value, the rate at which it rises is considerably slower than the rate at which it dropped prior to time $t_1$.

Because of the lower rate of change of flux, the voltage $e_i$ induced in field 22 will be less. The integration will thus proceed at a slower rate, and the voltage $e_b$ will take a longer time to reach the minus 6.8 volt level.

At time $t_2$, the flux reaches the value $\phi_2$, and the voltage $e_b$ reaches minus 6.8 volts. This causes the output of the amplifier 48 to change from plus 10 volts to minus 10 volts and reverses the polarity of the output of the bridge amplifier so that the output 62 becomes negative. The flux then begins to decrease from the value $\phi_2$. It decreases exponentially, but at a higher rate in comparison with the rise between times $t_1$ and $t_2$ because it has a substantial positive value.

Thus, the voltage $e_i$ is now negative, and has a greater magnitude than it had between times $t_1$ and $t_2$. This causes the integrator to change its output $e_b$ at a faster rate so that $e_b$ rises from minus 6.8 volts to plus 6.8 volts in a shorter period of time. At the time $t_3$, the flux has again reached the value $\phi_1$.

This operation, as described above, will continue as long as input voltage $e_a$ remains at zero. The flux $\phi$ will continue to rise and fall between two values $\phi_1$ and $\phi_2$. The difference between these two values is very small in comparison with the average value of flux, so that the rising and falling of the flux represents a very small ripple superimposed upon the average value of the flux. The flux waveform in FIG. 2D has its $\phi$ axis interrupted to allow the waveform to be displayed with the ripple suitably magnified.

It should be observed that the circuit of FIG. 1 is not capable of directly measuring the flux; it is only capable of measuring the *change in flux*, in this case from $\phi_1$ to $\phi_2$. Over a period of minutes, any errors in the integration could result in a gradual, but very small drift in the average value of the flux.

It should also be noted that, in general, if a constant voltage is applied to the field of a generator, the current in the field will follow approximately an exponential curve with respect to time. The flux in the generator will therefore follow a similar curve, differing somewhat due to hysteresis and saturation. Actually, as the magnetic circuit becomes more saturated, the inductance decreases and permits the current to rise or fall more rapidly and partially compensate for the saturation, making the flux follow more closely an exponential curve.

If the voltage applied to the field of a generator is changed from a negative to a positive value, for example, the flux will increase exponentially from a negative to a positive value, the slope of the exponential curve decreasing as the flux becomes more positive. As the flux is changed, it requires more and more time to increase the flux by a specified amount.

Similarly, if the voltage applied to the field is changed from a positive to a negative value, there will again initially be a fast change in the flux, with the rate of change decreasing as the exponential curve becomes more and more horizontal.

The above described behaviour explains why a negative change in the flux $\phi$ in the generator of FIG. 1 is more rapid than a change in the positive direction, when the flux has a substantial positive value.

The circuit of FIG. 1 has been described for the case where input voltage $e_a$ is zero, and where the flux $\phi$ has a substantial positive value. If the flux $\phi$ had a smaller value, the flux would rise and fall along portions of exponential flux/time curves which lie closer to the time axis, and the time between $t_1$ and $t_2$, and between $t_2$ and $t_3$ would be more nearly equal. This, of course, results in a lower average D.C. voltage applied to the generator field 66, and results in a lower current through this field.

Similarly, if the average value of the flux is zero, the time between $t_1$ and $t_2$ is essentially equal to the time between $t_2$ and $t_3$; the difference if any, is just enough to compensate for the hysteresis of the generator magnetic circuit.

Figure 2D:
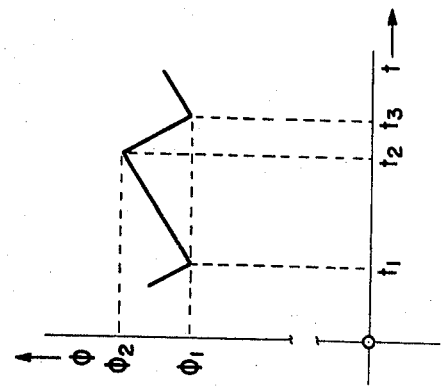
FIGS. 2a, 2b, 2c and 2d are diagrams showing various waveforms associated with certain points of the circuit of FIG. 1.
Figure 2C:
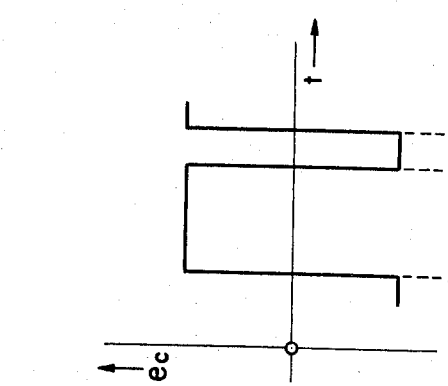
Figure 2B:
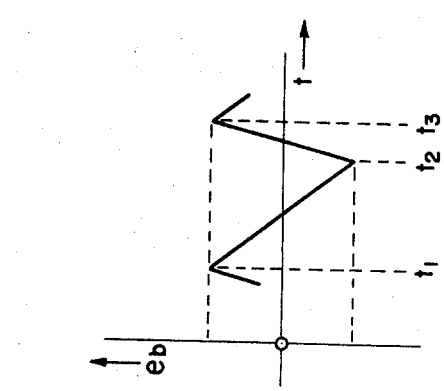
Figure 2A:
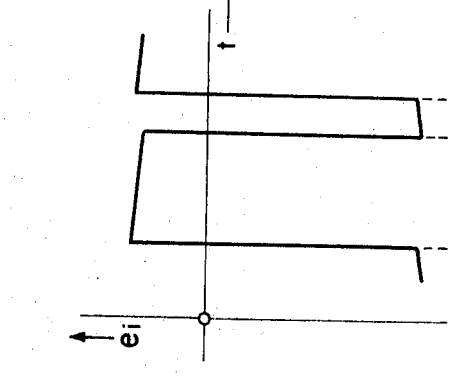

If the frequency is high, the flux waveform consists of such small portions of the exponential flux/time curves that the portions are essentially linear. Then, the waveforms of $e_i$ and $e_b$ are comprised essentially of straight lines as shown in FIGS. 2A and 2B.

Due to saturation of the magnetic circuit of the generator, the flux does not exactly follow exponential curves when changing from one value to another. However, the integrator still accurately measures the change in flux, and no errors occur due to saturation.

Another way of analyzing the circuit of FIG. 1 is to observe that the integrator consisting of the amplifier 28, resistors 24, 30 and 36 and the capacitor 40 cannot have a net D.C. input if the output is to remain between the limits imposed by the amplifier 48. Thus, with input $e_a$ zero, the system requires an average value of zero for voltage $e_i$. This in turn requires that the average value of flux remain at a *constant* value, not necessarily at zero.

However, if the input voltage $e_a$ has a value other than zero, the induced voltage $e_i$ must have a corresponding D.C. value of opposite polarity to $e_a$, and of higher magnitude by the ratio 150/27 of the resistors 24 and 30. Otherwise, the output of the integrator would go beyond the limits imposed by the amplifier 48. Thus, the average value of the flux must change at a rate proportional to input voltage $e_a$, in order to induce a suitable D.C. voltage in the extra field 22.

The overall operation of the circuit of FIG. 1 thus permits the flux $\phi$ and, hence, the generated voltage $e_g$ to be accurately controlled by the input voltage $e_a$. This operation will now be analyzed in further detail with reference to the exemplary waveforms in FIG. 3.

Figure 3:
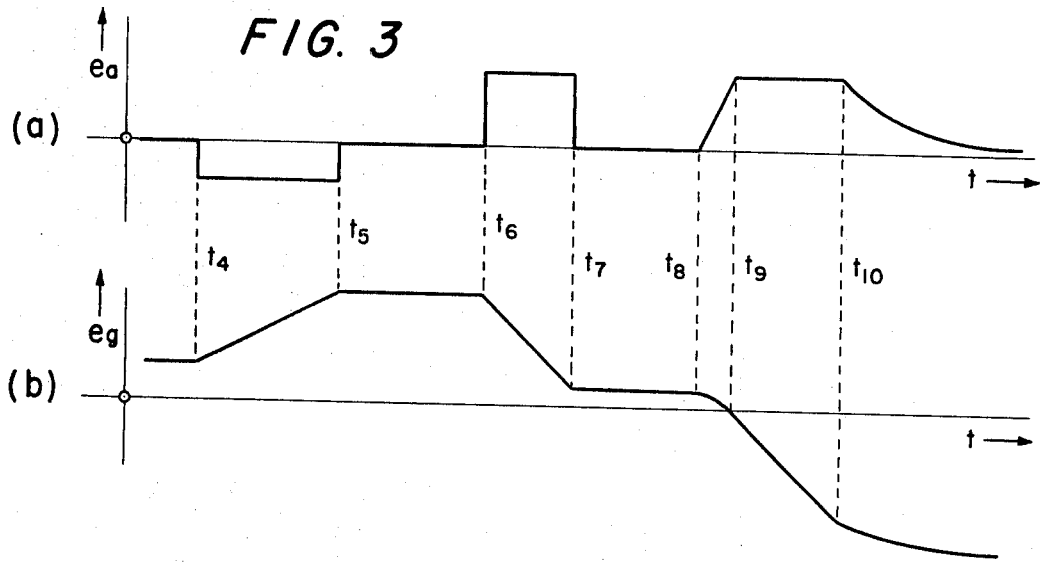
FIGS. 3a and 3b are graphs illustrating the overall operation of the circuit of FIG. 1.

The overall performance of the circuit of FIG. 1 is illustrated by the waveforms (a) and (b) in FIG. 3. Prior to time $t_4$, the flux is assumed to have a value which makes the generator voltage $e_g$ positive, with a value considerably less than rated voltage.

Between times $t_4$ and $t_5$, a negative voltage is applied to input $e_a$ of the circuit of FIG. 1. This causes the flux, and hence $e_g$, to increase at a constant rate.

Between times $t_5$ and $t_6$, the input voltage $e_a$ is zero and thus voltage $e_g$ remains constant.

Between times $t_6$ and $t_7$ a positive voltage, of greater magnitude than between times $t_4$ and $t_5$, is applied to input $e_a$. This causes $e_g$ to decrease with a proportionately greater slope than before.

Between times $t_7$ and $t_8$ the input $e_a$ is again zero, and thus the flux, and hence $e_g$ remains constant.

Between times $t_8$ and $t_9$ the input $e_a$ is changed linearly with respect to time to produce a parabolic shape to the waveform of $e_g$. Here, the slope of the $e_g$ waveform gradually becomes more negative as $e_a$ becomes more positive.

Between times $t_9$ and $t_{10}$, the voltage $e_a$ is positive, but constant; this causes the voltage $e_g$ to become increasingly negative at a constant rate.

Finally, at time $t_{10}$ the input $e_a$ is brought exponentially back toward zero. This produces an exponential rounding off of $e_g$ to a negative value.

These waveforms in FIG. 3 illustrate how complete control of voltage $e_g$ can be accomplished by input $e_a$. The voltage $e_g$ can be made to rise or fall at a constant rate, or parabolically, or exponentially by suitably controlling input $e_a$. The overall circuit is basically, an integrator. The output voltage $e_g$ is proportional to the time integral of the input voltage $e_a$.

It is important to note that in the more complete circuits illustrated in later figures, the armature of the generator is connected electrically to the armature of a D.C. motor, and the voltage $e_g$ cannot be directly measured because of the internal voltage drop in the armature due to armature current flowing through the armature resistance. The terminal voltage, or the brush to brush voltage, differs from $e_g$ by the IR drop.

Thus, the advantage of being able to control the voltage $e_g$ becomes more apparent.

Figure 4:
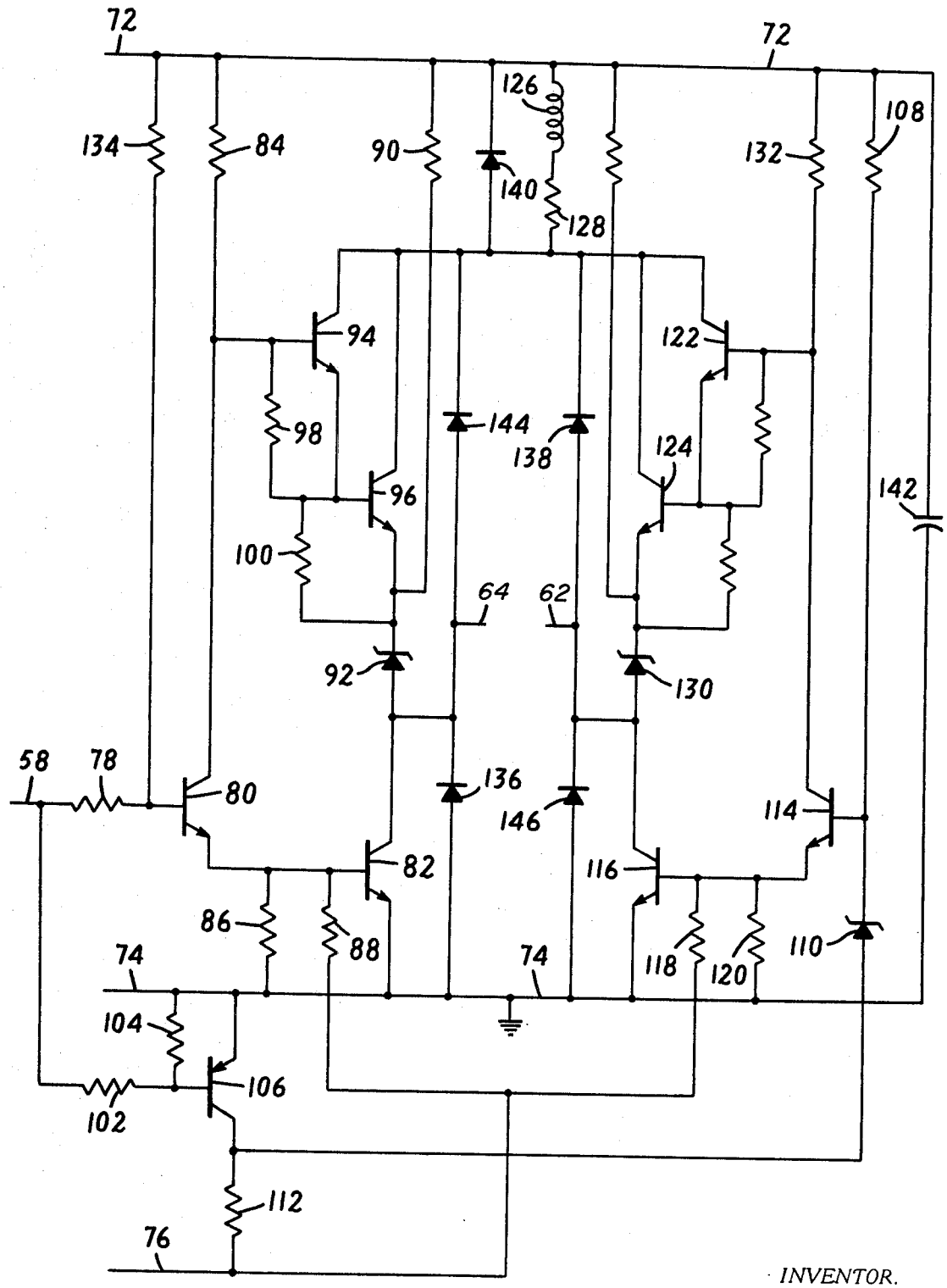
FIG. 4 is a schematic drawing of the bridge amplifier shown as a block in FIG. 1.

One possible circuit for a bridge amplifier is illustrated in FIG. 4. A suitable source of D.C. power is required to provide a positive voltage on line 72 with respect to line 74 which is at ground potential. A voltage of 120 is a practical value consistent with available power transistors, and, for typical windings on generators. A bridge amplifier capable of supplying 2.5 amperes is generally sufficient to drive one-half of the shunt field on average sized generators. Power transistors capable of higher voltages or currents are available and could be used, if desired.

Also, line 76 requires a negative voltage; a voltage of minus 12 volts could be suitable. This voltage would normally be obtained from the same supply which provides plus and minus 12 volts (or some other suitable voltage) for the operational amplifiers.

The input 58 to the bridge amplifier is assumed to be controlled by an operational amplifier, such as the amplifier 48 shown in FIG. 1, so that it always has either one of two voltages, for example, plus 10 and minus 10 volts.

The output lines 62 and 64 are assumed to be connected to an inductive load such as a generator field as shown in FIG. 1.

The circuit will be analyzed first for the case where input 58 is plus 10 volts. Then, sufficient current flows through resistor 78 and into the base of transistor 80 to turn it on. The emitter of transistor 80 cannot assume a positive voltage, with respect to ground, of more than about 1 volt due to the diode action between the base and emitter of transistor 82.

The turning on of transistor 80 causes a larger amount of current to flow from line 72 through resistor 84, through transistor 80 and into the base of transistor 82. This turns transistor 82 on. The purpose of transistor 80 is to amplify the current through resistor 78 sufficiently to turn on power transistor 82. A small portion of this current flows through resistors 86, and 88 which function, at other times, to turn transistor 82 off.

The turning on of transistor 82 causes current to flow from line 72 through resistor 90 and through Zener diode 92 and transistor 82 to ground. The current through resistor 90 is sufficient to develop a few volts across Zener diode 92, which has a Zener voltage of 3.9 volts, to assist in turning off transistors 94 and 96.

The turning on of transistor 80 brings the base of transistor 94 down close to ground potential, while the emitter of 96 is held a few volts positive with respect to ground, as previously described. Thus, resistors 98 and 100 have current flowing upwardly through them. This develops voltage drops which assure that the bases of transistors 94 and 96 are held negative with respect to their emitters. Thus, transistors 94 and 96 are turned off.

The result, then, of turning on transistor 80 is to turn on transistor 82, turn off transistors 94 and 96. This causes the output 64 of the bridge amplifier to be connected to ground through transistor 82.

In addition, input 58, being about 10 volts positive, causes current to flow through resistors 102 and 104 to ground; this current holds the base of transistor 106 slightly positive so as to turn transistor 106 off.

This permits current to flow from line 72 through resistor 108, through Zener diode 110 and through resistor 112 to the negative supply line 76. Zener diode 110 has a Zener voltage of 5 volts, and the current through the resistor 112 which has a value suitable to develop a drop of about 3.5 volts. Therefore, the base of transistor 114 is held at about 3.5 volts negative with respect to ground (the 12 volts of line 76 less the 3.5 volt drop in the resistor 112 and the 5 volt drop in the Zener diode 110). Transistor 114 is therefore turned off.

With transistor 114 turned off, the base of transistor 116 is held at a negative value by the voltage divider effect of resistors 118 and 120, since current flows from ground through these resistors to the negative supply line 76.

Also, the turning off of transistor 114 causes the base of transistor 122 to rise to a high positive voltage. The transistor 122 operates as an emitter follower to raise the base of the transistor 124 to almost as high a voltage. Transistor 124 also operates as an emitter follower to pull up the output 62 toward the level of line 72.

If no current flows through the load, the output 62 is held at a high positive voltage. If current flows from line 72 through the choke 126 and resistor 128, and then through the transistor 124 and Zener diode 130, and out line 62 to the load, a voltage drop occurs across the resistor 128 which assures sufficient current through the resistor 132 to turn on transistor 122, and thus assuring that the transistor 124 is turned on sufficiently.

Thus, the result of turning off the transistor 114 is the connection of output 62 to the positive supply line 72 through elements 126, 128, 124 and 130 and the turning off of the transistor 116.

Thus, the application of plus 10 volts to the input 58 of the bridge amplifier causes the output 64 to be grounded, and the output 62 to be raised to a positive value close to the voltage of line 72.

Similarly, it can be shown that application of minus 10 volts to input 58 causes the output 62 to be grounded and the output 64 to be raised to a positive value close to the voltage of line 72.

When input 58 is at minus 10 volts, a voltage divider consisting of resistors 134 and 78 causes the base of transistor 80 to be about 2.5 volts negative with respect to ground. Transistor 80 is thus turned off. The turning off of the transistor 80 produces a result similar to that of turning off the transistor 114, described above, except that now it is transistor 82 which turns off, and transistors 94 and 96 which turn on.

Also, when the input 58 is at minus 10 volts, current flows from ground through the emitter-base of the transistor 106 and through the resistor 102 to the input 58. This turns the transistor 106 on, and its collector then rises up to almost ground potential. This enables current to flow from line 72 through the resistor 108 into the base of transistor 114 to turn it on. The voltage drop across the Zener diode 110 is then less than its Zener voltage, so that it passes only negligible current.

The turning on of the transistor 114 is similar to the turning on of the transistor 80 described previously, except that now it is the transistor 116 which turns on, and the transistors 122 and 124 which turn off.

The basic action of the bridge amplifier has now been described. The input 58, by being positive or negative, causes power transistors to connect the output lines 62 and 64 to the supply line 72 and 74, in one polarity or the other. A small drop in voltage is accepted, through Zener diodes 92 and 130 and also through resistor 128, and choke 126, in order to obtain the necessary currents or voltages to turn the various transistors on or off. In spite of this, most of the line voltage between lines 72 and 74 can be applied across the load.

The load current does not necessarily flow through the power transistors 96 and 116 or 124 and 82, however. Assume that while input 58 is negative, a substantial amount of current is flowing from line 72 through elements 126, 128, 96, 92, the load, and 116. Then, when input 58 becomes positive, transistors 96 and 116 turn off, and transistors 124 and 82 turn on.

The current, however, cannot reverse suddenly due to the inductance of the load, and a voltage is induced in the load which is sufficient to keep the current flowing through the path from line 74 through diode 136, the load, and through diodes 138 and 140 to the line 72. This current tends to charge a capacitor 142, which has sufficient capacity to prevent the line 72 from raising its voltage appreciably during the brief time when this inductive current flow continues.

If the bridge amplifier remained in this condition long enough, with input 58 positive, the current would eventually reverse and it would then flow through elements 124, 130 and 82. Normally, however, the bridge amplifier remains in one condition for only a brief time.

The purpose of the diodes 136, 138, 140, 144 and 146 is to provide a path for such inductive flow of current so that excessive voltages cannot appear across the transistors. The purpose of choke 126 is to prevent dangerous spikes of current if, momentarily during switching, there occurs a path through elements 96, 92 and 82 or through elements 124, 130 and 116.

The circuit shown in FIG. 4 is only an example of a switching bridge amplifier. Any suitable circuit which can reverse the polarity of an inductive load may be used in this invention.

Figure 5:
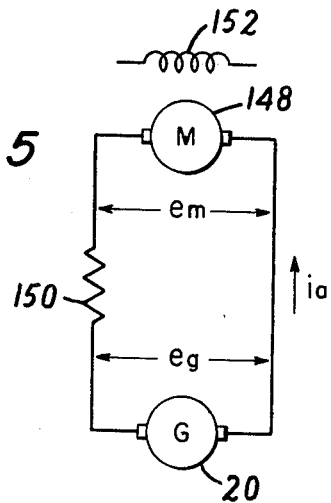
FIG. 5 is an equivalent electrical circuit for the generator and motor armature connection.

FIG. 5 shows the equivalent electrical circuit for the usual connection between the generator armature 20 and the armature 148 of the motor whose speed is to be controlled. Normally, the two armatures are permanently connected together by heavy wiring, possibly through the coil of an overload relay.

In FIG. 5 the total armature resistance, consisting of the resistances of both armatures plus the connecting wires, has been lumped into one resistor 150 with a value of $R_a$ ohms. The two armatures, then, are assumed to have zero resistance for analysis purposes. This well known method of circuit analysis allows the internally generated voltage $e_g$ of the generator and the internal voltage $e_m$ of the motor armature to be isolated for explanatory purposes from the armature voltage drop $R_a i_a$. The current in the armature loop is $i_a$.

It is assumed that the field 152 of the motor has a constant current flowing through it from a suitable power supply. Then, the speed of the motor is proportional to the voltage $e_m$. It is also assumed that the field of the generator is supplied by a bridge amplifier and circuit such as shown in FIG. 1.

This equivalent circuit of FIG. 5 is to be used in the analysis below in connection with the graphs of FIGS. 6, 7 and 8.

Figure 6:
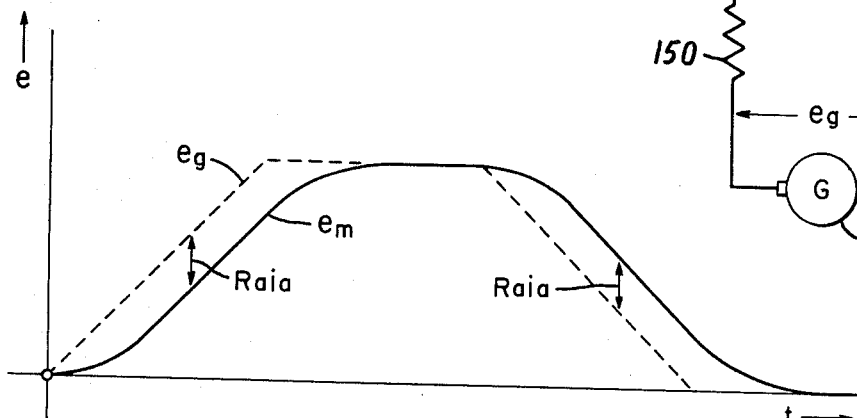
FIGS. 6, 7 and 8 are diagrams showing waveforms which illustrate the performance of the circuit of FIG. 5.

FIG. 6 illustrates the behaviour of the voltage $e_m$ when $e_g$ rises at a steady rate from zero to a plateau, remains there for a short period, and then descends to zero at the same rate. It is assumed that the load on the motor does not have an unbalanced condition such as a counterweight heavier or lighter than an elevator car. An elevator system, with the load on the car adjusted so that the total car weight equals the counterweight, would be a suitable load for the curves of FIG. 6.

For the major portion of the period where $e_g$ is rising at a constant rate, voltage $e_m$ is also rising at the same rate, but separated from it in time by the amount required to make the voltage difference between $e_g$ and $e_m$ sufficient to cause a flow of current $i_a$ of the correct value to accelerate the mass. This separation between $e_g$ and $e_m$ is automatic and non-oscillatory. Obviously, if $e_m$ lags too far behind, it causes a higher current and this accelerates the motor at a higher rate. If $e_m$ approaches $e_g$ too closely, the current decreases and the acceleration rate decreases. Thus, the $e_m$ voltage is forced to rise at the same rate as the $e_g$ voltage.

Since the speed of the motor is proportional to $e_m$, the acceleration of the load, such as an elevator car, is constant over most of the period where $e_g$ is increasing linearly. It is only during the initial period that the acceleration of the load is not constant, but the effect is highly desirable since it results in a gradual build up to the full acceleration rate.

Thus, the resistance $R_a$ of the armature loop automatically smooths out the initial starting of the load so that the acceleration builds up gradually, rather than abruptly. Consequently, the "bump" or "jerk" (i.e. the second derivative of velocity with respect to time) is not excessive. Experience indicates that this effect is generally sufficient to start an elevator in a prompt, but not unpleasant fashion.

Similarly, if the $e_g$ voltage suddenly stops rising, the $e_m$ voltage rounds off smoothly to the equivalent steady value. Experience indicates that such rounding off to a steady speed such as top speed of an elevator is more abrupt than passengers are accustomed to. Therefore, it is better to round off the $e_g$ voltage for top speed, rather than allow it to stop abruptly. Also, for practical reasons, it is best to not follow the slope shown in FIG. 6 since it is difficult to predict in advance the exact instant at which $e_g$ must stop rising in order that the speed, when finally rounded off, be exactly the desired top speed. A more satisfactory technique, which will be discussed in connection with FIG. 8, is to make the slope of the $e_g$ curve proportional to the error between pattern speed and the actual speed, but never greater than a predetermined value.

The remainder of FIG. 6 shows how the voltage $e_m$ is reduced to zero when the voltage $e_g$ decreases linearly to zero. In this case, $e_g$ is less than $e_m$ by an amount equal to $R_a i_a$, since the same slope is used. If $e_g$ were to decrease at a more rapid rate, the current $i_a$ would have to be greater in order to decelerate the load at a more rapid rate, and the separation between the two curves would be greater.

Figure 7:
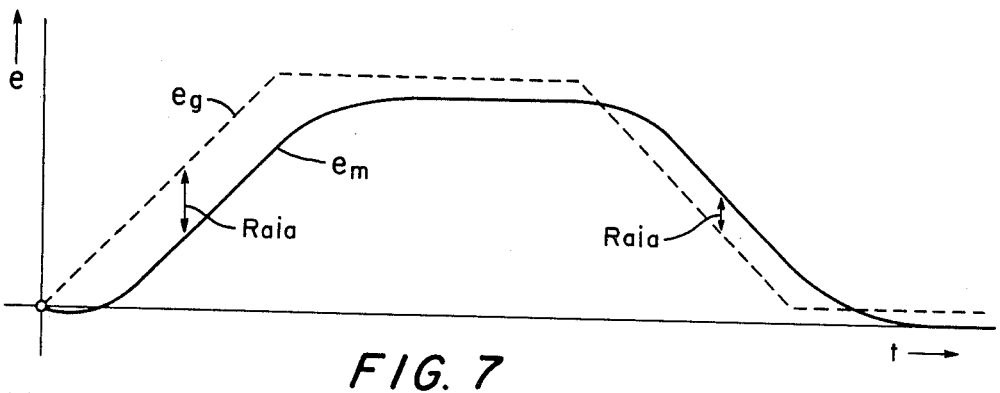

FIG. 7 shows a similar situation to that shown in FIG. 6; in this case, however, the motor has an unbalanced load such as would occur with an ascending elevator having a greater than balanced load in the car. Here the separation between $e_g$ and $e_m$ is greater during acceleration because the current $i_a$ must have an additional component, in addition to that required to accelerate the mass, in order to counteract the unbalance. Similarly, the separation is less during deceleration for the same reason; now the unbalance is assisting in the reduction of speed.

In order to increase $e_m$ to the same maximum value as in FIG. 6, $e_g$ must rise to a higher level so that, at constant speed, a suitable $R_a i_a$ drop exists to compensate the unbalance. Similarly, when the speed is reduced again to zero, the $e_g$ voltage must not decrease as far as zero. The net result is that the entire $e_g$ curve must be raised above the level it had in FIG. 6.

If the $e_g$ voltage can be raised to an appropriate value, depending on the unbalance, just prior to releasing the brake, the $e_m$ curve of FIG. 7 can be made identical to the $e_m$ curve of FIG. 6. However, this is difficult to do.

If the $e_g$ voltage starts out from zero in the same manner as in FIG. 6, the $e_m$ voltage, and thus the speed, will reverse briefly due to the unbalance after the brake releases, assuming that the brake releases at the same time that $e_g$ starts rising. This effect is the familiar "roll-back" which frequently occurs when a fully loaded elevator first starts an up run. A circuit will be described in connection with FIGS. 12 and 13 for detecting such a roll-back, and forcing $e_g$ to rise at a considerably higher rate while the motor is rotating backwards to thereby reduce the roll-back to a very small distance.

Figure 8:
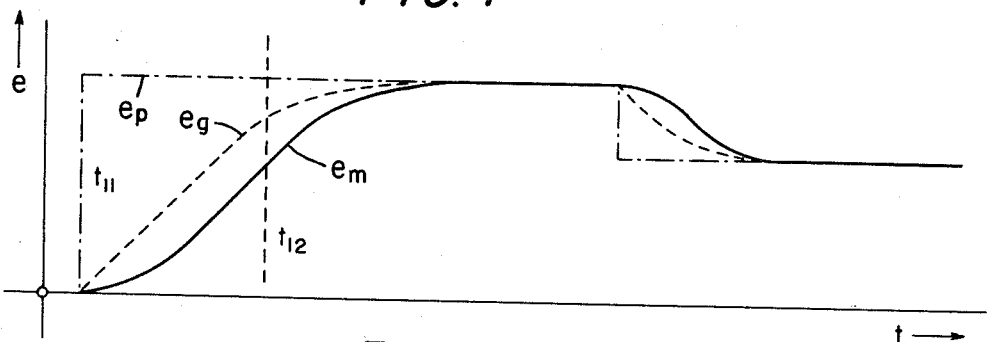

FIG. 8 shows the performance of a system in which the rate of change of flux, and thus the rate of change of $e_g$, is made proportional to the velocity error, but never greater than a predetermined value. A balanced load condition, as was the case in FIG. 6, is assumed. The velocity error is the difference between a pattern voltage $e_p$ and the speed as indicated by the voltage $e_m$. In a practical system, where $e_m$ cannot be measured directly, some other method or device for measuring speed would be used, such as a tachometer generator. The pattern voltage produced might be of considerably lower magnittude than $e_m$ and possibly of opposite polarity.

For explanatory purposes, the pattern voltage $e_p$ is assumed to rise abruptly at time $t_{11}$ to a value calling for full speed. The error between $e_p$ and $e_m$ is then quite high, more than enough to demand the maximum rate of increase for voltage $e_g$. Thus, between time $t_{11}$ and time $t_{12}$, the system operates in the same manner as the system of FIG. 6.

However, at time $t_{12}$, the error is now much smaller; in particular, it is just the amount required to produce the maximum rate of increase on voltage $e_g$. After time $t_{12}$, the slope of the $e_g$ curve is proportional to the difference between the voltages $e_p$ and $e_m$. As time progresses, this error decreases, and thus the slope of the curve decreases. The result is an exponential rounding off to the top speed. This curve exhibits a more gentle and conventional rounding off to top speed than does the curve shown in FIG. 6.

The remaining portion of FIG. 8 shows what happens when the pattern voltage $e_p$ drops suddenly to a somewhat lower level. Immediately, the error between $e_p$ and $e_m$ calls for an equivalent rate of decrease in the voltage $e_g$, but as the speed decreases, the difference between $e_p$ and $e_m$ decreases and thus the slope of the $e_g$ voltage decreases. The result is a smooth reduction in speed from the previous level to the new one demanded by the pattern voltage $e_p$.

A typical slowdown for an elevator might consist of a series of steps of reduction in a pattern voltage, such as the single one illustrated in FIG. 8.

Figure 9:
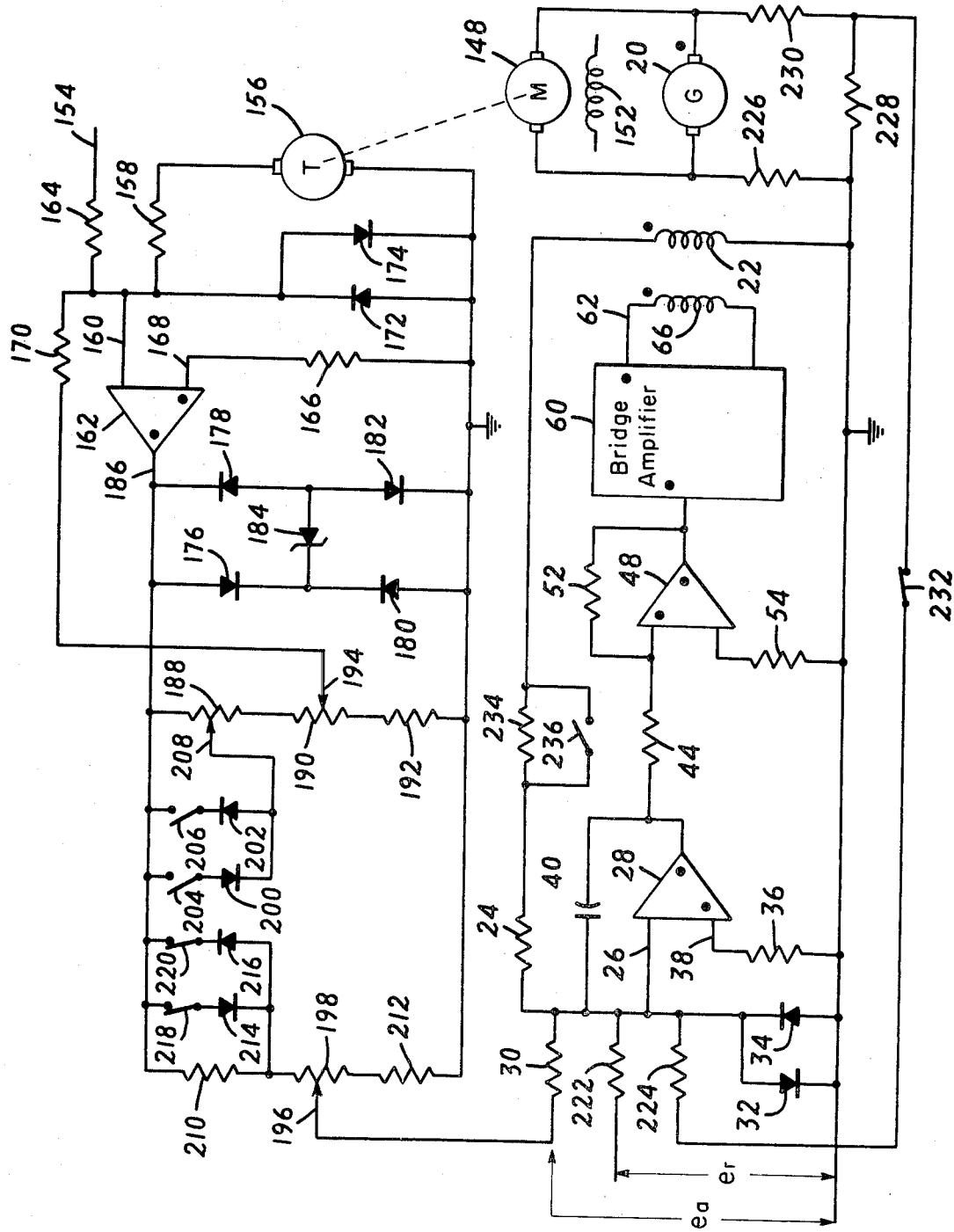
FIG. 9 is a schematic drawing of a more complete feedback system according to the present invention, in which pattern speed is compared with the measured speed of the motor.

FIG. 9 shows a circuit to accomplish the results shown in FIG. 8. The voltage applied to pattern input 154 dictates the speed; this voltage is proportional to the $e_p$ voltage of FIG. 8, and its polarity determines the direction of rotation of the motor.

The circuit of FIG. 9 is suitable for operating an elevator. The hoist motor for the elevator has its armature 148 connected electrically to the generator armature 20. The field 152 of the hoist motor is excited with substantially constant current of a suitable magnitude while the motor is running, or preparing to run; the current in the motor field may be lowered to a lesser value when the car has stopped in order to reduce the heat dissipated in the motor as is normally done in elevator installations.

A tachometer generator is used to provide a voltage proportional to the speed of the motor. A D.C. tachometer is desirable since its polarity is an indication of the direction of rotation of the motor. This tachometer is mechanically coupled to the motor by any suitable means such as friction drive, direct drive or by belts or gears. The excitation for the field of the tachometer generator may be derived from permanent magnets or from a suitably wound field supplied with substantially constant current.

The armature 156 of the tachometer generator is connected between ground and resistor 158 so that a current proportional to speed flows through resistor 158 into or out of the inverting input 160 of an operational amplifier 162. The inverting input normally departs from ground potential by such a very small voltage that, for practical purposes, it can be assumed to be at ground potential. It is assumed that the tachometer armature is so connected that upward motion of the elevator causes a positive voltage to be applied to the resistor 158 and downward motion causes a negative voltage to be applied to the resistor 158.

This polarity of the tachometer requires that the pattern input 154 be negative for up and positive for down. The value of resistor 164 can be chosen to suit the voltage level available from the pattern source. In a typical case, the tachometer voltage may be ⅕ volt for each foot per minute of elevator speed. Then, a car speed of 500 f.p.m. would produce 100 volts. If the resistance of resistor 164 were made 68K ohms and the resistance of resistor 158 made 680K ohms, it would require 10 volts positive on the input 154 to dictate a speed of 500 f.p.m. in the down direction, and similarly 10 volts negative on input 154 to dictate 500 f.p.m. up.

Resistor 166 connects the non-inverting input 168 of amplifier 162 to ground; resistor 166 is assumed to have a value equal to the equivalent of resistors 158, 164 and 170, in parallel. Protective diodes 172 and 174 are also used, as for amplifier 28 in FIG. 1, to protect the operational amplifier 162.

A clamping circuit consisting of diodes 176, 178, 180 and 182 and Zener diode 184 is connected between ground and the output 186 to the amplifier 162. Two matched Zener diodes could be used in series between the output 186 and ground, as an alternative. The purpose of this clamping is to prevent the voltage at the output 186 from exceeding a predetermined value which is somewhat lower than the supply voltage to the operational amplifiers. In FIG. 9 it is assumed that plus and minus 12 volts is used to supply the operational amplifiers, and that the Zener diode 184 has a Zener voltage of about 9 volts so that, wth the additional voltage drops in the diodes, the voltage at the output 186 of the amplifier 162 is prevented from swinging more than about 10 volts positive or negative with respect to ground.

A voltage divider, consisting of resistors 188, 190 and 192, is connected as a load on the output of the amplifier 162, and the sliding tap 194 on the resistor 190 is connected through resistor 170 back to the inverting input 160 of the amplifier 162. This arrangement causes the voltage on the output 186 of the amplifier to assume a value proportional to the difference between the currents in resistors 164 and 158, and thus proportional to the error between the pattern speed introduced at the input 154 and the speed as measured by the tachometer generator.

This use of an operational amplifier is well known and is sometimes referred to as a summing amplifier. Any unbalance in the currents through the resistors 170, 164 and 158 swings the voltage at the inverting input 160 in such a direction as to make the output 186 swing in the opposite direction, highly amplified, until the new value of current through the resistor 170 balances the difference between the currents in the resistors 164 and 158.

If the slider 194 is moved toward the resistor 188, more current flows through the resistor 170, for a given voltage at the output 186 and thus a larger error, between pattern speed and measured speed, is required to produce a given voltage at the output 186. Similarly, if slider 194 is moved toward the resistor 192, a smaller error is required to produce a given voltage at the output 186.

The voltage obtained from the output 186 of the amplifier 162 is basically applied, through a voltage divider, to a circuit almost identical with the circuit of FIG. 1. Thus, the velocity error determines the rate of change of flux in the generator, and operation similar to that illustrated in FIG. 8 is obtained. Generally, the full clamped voltage of plus or minus 10 volts on the output 186 produces the full acceleration value which can be adjusted to a suitable value by a slider 196 on a resistor 198.

The effect of the slider 194 is to determine how much velocity error is required to produce the fully clamped swing of the voltage at the output 186 and hence, to produce the full acceleration value. Thus, if slider 194 is set near the resistor 188 (upper end), a large velocity error is required to produce full acceleration, and therefore, as illustrated in FIG. 8, the speed starts to round off, as at time $t_{12}$, when the measured velocity is very much lower than the pattern velocity. This results in a very gentle rounding off to full speed. Alternatively, if the slider 194 is set near the resistor 192 (lower end), the measured velocity can rise to a value much closer to the pattern speed before the time $t_{12}$ is reached, and then the round off to top speed is more abrupt.

Thus, potentiometer 190/194 can be adjusted for very smooth, but perhaps too sluggish response, or for very quick, but perhaps too bumpy response, and in between these two extremes a setting can be found which is suitable.

In addition to this, diodes 200 and 202 and contacts 204 and 206 can be used to obtain, in effect, different settings of the slider 194 for the two parts of a typical run: first, the acceleration up to top speed; second, the slowing down and stopping. Relay 204 is assumed to be energized to cause the car to run in the up direction; it picks up at the beginning of the run, possibly just before the brake is energized, and drops out when the car reaches the final stopping point, usually about ½ inch from floor level. It does not pick up during a relevelling operation. Similarly, relay 206 is assumed to be energized for a down run, but not when the car relevels down. Such relays are commonly used in elevator systems, and circuits suitable for operating such relays are shown in the Canadian Pat. No. 774,755 and in the corresponding U.S. Pat. No. 3,407,905.

When an up trip is in progress, the contact 204 is closed and thus diode 200 is connected across a portion of the resistor 188; the slider 208 determines how much of the resistor 188 is shunted by the diode. During the acceleration to top speed, in the up direction, the polarity of the voltage at the output 186 is positive and thus the diode 200 has forward current through it. This diode therefore bypasses a portion of the resistor 188 and has the same effect as moving slider 194 toward the resistor 188, causing a more gentle round off to top speed. However, when the car is slowing down, but still travelling in the up direction, the voltage at the output 186 is negative, and the diode can pass no current.

Similarly, when a down trip is in progress, the contact 206 is closed to connect the diode 202 across the same portion of the resistor 188. During the acceleration to full speed in the down direction, the voltage at the output 186 is negative, and forward current flows through the diode 202 to bypass part of resistor 188. During the slowing down, in the down direction, the voltage at the output 186 is positive and the diode 202 passes no current.

Thus, the slider 208 may be adjusted to obtain a considerably smoother round off to full speed, without affecting the performance during slowdown. This adjustment is particularly desirable on trips from one floor to an adjacent one where the motor does not reach full speed. In this case, the pattern voltage at the input 154 may be decreasing rapidly at the instant that the rising motor speed causes the voltage at the output 186 to begin changing from its clamped value in one polarity towards its clamped value in the opposite polarity, in order to change the motor from acceleration to deceleration. Slider 208 can be used to cause this process to begin earlier, and thus provide a more gentle change from acceleration to deceleration.

A further voltage divider, consisting of resistors 210, 198 and 212, is connected between the output 186 and ground. Slider 196 on potentiometer 198 is then used to create a voltage $e_a$ which is applied to the resistor 30 in a circuit closely similar to that of FIG. 1. Slider 196 can be adjusted to give a suitable value of acceleration. Moving it toward the resistor 210 gives a greater rate of increase of generator flux, and thus a greater rate of increase for voltage $e_g$, and thus a higher value of acceleration.

A further circuit consisting of diodes 214 and 216, and contacts 218 and 220 can be provided to allow for a larger value of acceleration (actually, deceleration) when the motor is slowing down than the value of acceleration when the motor is accelerating. Such a circuit is not required if a single step of slowdown is used, as might be used on installations where the speed is relatively low, such as 200 f.p.m. In this case, at a fixed distance from a floor where a stop is to be made, the pattern would abruptly drop, from a voltage corresponding to full speed to a voltage corresponding to landing speed, and this latter voltage would remain until the car reached the final stopping point, possibly about ½ inch from floor level.

For higher speeds, however, it is preferable to have a larger number of steps of slowdown or even a continuously varying pattern based on car position. In this case, the speed of the elevator is controlled by the pattern voltage during slowdown, and the system should be capable of a somewhat higher value of acceleration (actually, deceleration) during the slowdown so that there will be no tendency for the clamping of the voltage at the output 186 to limit the performance, and thereby cause an overshoot, if the pattern should decrease slightly more rapidly than the motor speed is allowed to decrease as determined by the setting of the slider 196.

When an up run is in progress, the contact 218 is open; consequently the diode 214 is disconnected and the diode 216 is in parallel with the resistor 210. During the acceleration to full speed, the voltage at the output 186 is positive, and the diode 216 passes no current. During the slowing down of the motor, the voltage at the output 186 is negative, and the diode 216 shorts out the resistor 210 to increase the current through the resistors 198 and 212. This increases the voltage on the slider 196 and is equivalent to moving the slider 196 toward the resistor 210.

Similarly, when a down run is in progress, the contact 220 is open and thus the diode 216 is disconnected and the diode 214 is in parallel with the resistor 210. During the acceleration to full speed in the down direction, the voltage at the output 186 is negative and the diode 214 passes no current. During the slowing down, the voltage at the output 186 is positive and the diode 214 shorts out the resistor 210 to increase the voltage on the slider 196.

During a relevelling operation, the contacts 204 and 206 are open, and the contacts 218 and 220 are closed. Thus, the resistor 210 is shorted out by the diode 214 for one polarity and by the diode 216 for the other polarity while the resistor 188 is not shorted with either polarity. This results in the fastest response because the shorting of the resistor 210 gives the higher value of generator flux change, for a given voltage on output 186 and the resistor 188 being not shorted gives the higher value to the output 186 for a given error.

The remaining portion of FIG. 9 contains a circuit similar to FIG. 1, however, with several differences. Additional input resistors 222 and 224 are connected to the input 26 of the operational amplifier 28. The purpose of the resistor 222 is to allow for a voltage $e_r$ to be applied to give a rapid change of generator flux if the motor moves in the wrong direction when starting. A circuit for doing this will be described in connection with FIG. 12.

A further feedback circuit is shown in FIG. 9 to obtain what is known as "suicide" action when the motor has stopped. This action is to hold the generator voltage at a low value so that excessive currents cannot circulate in the motor and generator armatures.

A voltage divider consisting of the resistors 226, 228 and 230 is provided to obtain a voltage across the resistor 228 which is approximately ¼ of the generator terminal voltage. The connection between the resistors 226 and 228 is grounded. The connection between the resistors 228 and 230 is connected through the contact 232 to the resistor 224 at the input 26 of operational amplifier 28.

Relay 232 is arranged to be energized whenever the motor is running, and for about 1 second after the brake is de-energized when the car stops. Thus, the contact 232 is open for running, and closes when suicide action is required. Such a contact is used in most elevator systems, and a circuit suitable for operating such a relay is shown in FIG. 2 of Canadian Pat. No. 774,755 or the corresponding U.S. Pat. No. 3,407,905.

When the car is running, the contact 232 is open and the resistor 224 has no effect on the amplifier 28. When the motor has been slowed to a landing speed and is to be stopped, the pattern voltage at input 154 is changed to zero and, at the same time, the brake is de-energized. Sufficient inductive delay is normally built into the brake to prevent it from applying before the motor has come to a stop. Contact 232 must remain open until the brake has applied. The system initially sees zero pattern voltage with a tachometer voltage indicating continuing motion of the motor. This causes the system to change the level of flux in the generator in such a direction as to bring the car to a stop. When it has come to a stop, the system holds the flux at that level in order to hold the car stationary while the brake applies. The system illustrated in FIG. 9 is particularly effective in bringing the motor to a smooth stop. However, if the flux remained at this level, which could be significantly different than zero if the load on the car were unbalanced, high currents could continue to circulate in the motor and generator armatures.

The closing of the contact 232 causes the application of a voltage through the resistor 224 to operational amplifier 28 of such a polarity as to cause the flux to be reduced to a very low value. If, for example, the right side of the generator armature 20, which has the polarity dot adjacent to it, is positive, it is necessary to apply a more negative voltage on the output 62 of the bridge amplifier 60, tending to make the right side of armature 20 also more negative. This suicide action brings the generator armature voltage down to near zero, and holds it there. During this time, it is assumed that the voltage at the input 154 is zero and that the tachometer voltage is also zero and that, therefore, the $e_a$ voltage applied to the resistor 30 is zero.

A further difference between the circuit of FIG. 9 and the circuit of FIG. 1 is the addition of the resistor 234 and the contact 236. The relay for the contact 236 is assumed to be equivalent to a brake contactor; such a relay is required on any traction elevator installation, and circuits for energizing such a relay are well known. Thus, when the motor is running, the contact 236 is closed and the resistor 234 is shorted out so that the feedback circuit from the field 22 has the same resistance as in FIG. 1. When a stop is called for, the contact 236 opens and introduces the extra resistance 234. This requires higher voltages to be induced in field 22 and, hence, the flux must change more rapidly. This circuit modification can cause the motor to be brought more rapidly to a final stop, without affecting the rest of the run.

The circuit of FIG. 9 is particularly suitable for an installation where the input pattern voltage has many small steps of reduction during the slowdown of the motor, with each reduction occurring at a particular distance between the car and the floor it is stopping at, or alternatively where the pattern is stepless and controlled by the distance between the car and the floor it is stopping at.

Figure 10:
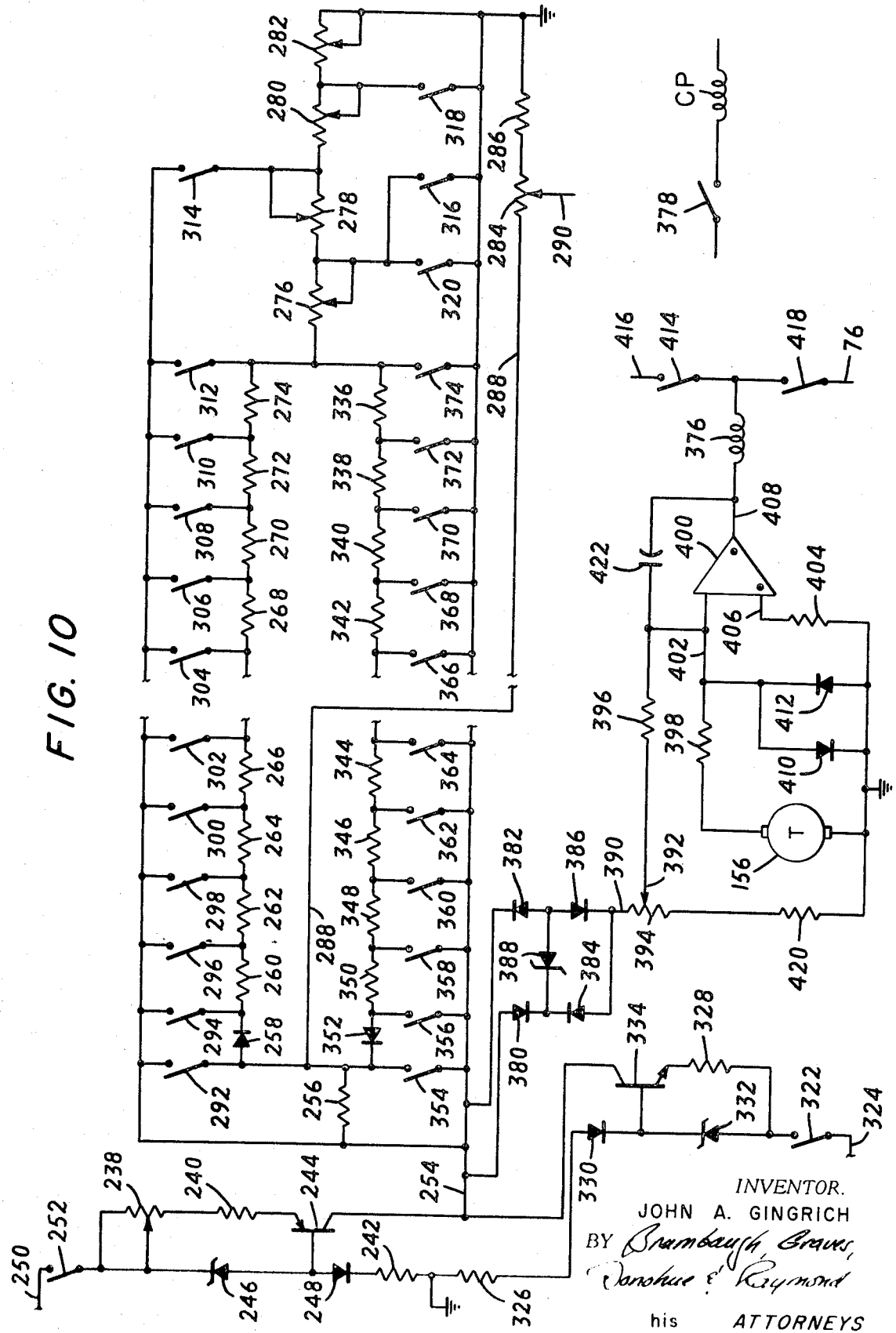
FIG. 10 is a schematic drawing of a circuit to produce a speed pattern.

FIG. 10 shows a circuit for obtaining a large number of small steps of pattern reduction. It is based on the system described in Canadian Pat. No. 774,755 and in the U.S. Pat. No. 3,407,905 where an electromagnet in the hoistway, called a "position magnet," is energized at a floor where the car is to stop. The approach of the car to that floor results in the closing of a sequence of various proximity contacts mounted in a vertical column on the car while each proximity contact is in the operating range of the electromagnet. The operating range depends upon the dimensions of the magnet, but it is assumed that the dimensions are such that once a proximity contact has closed, it remains closed for about 12 inches of car travel. The circuit of FIG. 10 is based on the positioning of the various proximity contacts in such a way that, during a slowdown, there is always enough overlap so that at least one is closed at all times. This means that adjacent contacts must not be spaced apart vertically by more than 12 inches.

This arrangement of proximity contacts allows deletion of speed relays V3, V4, V5, V6, V7 and V8 shown in FIG. 3 of the abovementioned patents. The proximity contacts are not used to control the dropping out of speed relays, but instead are used to directly produce a pattern voltage. A series of equal resistors has a constant current passed through them, and the voltage across these resistors is the pattern. The proximity contacts short out more and more of these resistors as the car approaches the floor, to give a diminishing voltage for the pattern. Since these resistors are mounted on the car near the proximity contacts, the number of wires required between the car and the control equipment in the machine room is reduced, and is independent of the number of steps of slowdown.

In FIG. 10, a constant current source, consisting of the resistors 238, 240 and 242, transistor 244, Zener diode 246 and diode 248, can be energized from a positive supply line 250 when contact 252 closes. The relay for the contact 252 is assumed to be a down relay or contactor which is energized at the same time as the relay for contact 236 which was described in connection with FIG. 9. Thus contact 252 closes whenever the motor is required to move in the down direction.

If the Zener diode 246 has a Zener voltage of 5 volts, the resistor 238 can be adjusted to carry the constant current over a range from well below, to well above 40 ma. The purpose of this adjustment is to enable this constant current source to be adjusted to exactly match another constant current source, used for the up direction, which is not adjustable but which has a nominal value of 40 ma.

The output of this constant current source is applied to the wire 254, and this constant current then flows through the resistor 256, the diode 258, and then through a long series arrangement of equally valued resistors 260, 262, 264, 266 . . . 268, 270, 272 and 274 and then through adjustable resistors 276, 278, 280 and 282 to ground. A portion of the 40 ma. current also flows through resistors 284 and 286 to ground, but since the resistance of this path is much higher than the other path, the majority of the current flows through the former path, and a negligible amount through the latter.

The purpose of resistors 284 and 286 is to provide an adjustable portion of the voltage developed on line wire 288 as a pattern voltage. The sliding tap 290 on resistor 284 is intended to connect to input 154 in FIG. 9. The voltage developed in wire 288 is proportional to the resistance between wire 288 and ground, since a constant current flows through this resistance.

If all proximity contacts are open, a voltage of typically 28 volts would be created on wire 288; this voltage is dependent on the settings of resistors 276, 278, 280 and 282. Such a condition exists if the proximity contacts have not yet entered an energized position magnet.

As the car approaches a floor where a stop is to be made in the down direction, the proximity contacts close in the order 292, 294, 296, 298, 300, 302 . . . 304, 306, 308, 310, 312. The closing of the proximity contact 292 causes the voltage on wire 254 to decrease by about 8.8 volts (40 ma. times 220 ohms, the value of resistor 256), and thus it assumes the same voltage as wire 288 which does not change. The purpose of the contact 292 and the wire 254 will be apparent later.

The closing of the proximity contact 294 allows the 40 ma. constant current to bypass the diode 258, which has a forward voltage drop of approximately 0.8 volt. The voltage on wire 288 is thus reduced by approximately 0.8 volt.

The subsequent closing of the proximity contact 296 bypasses the diode 258 and the resistor 260. This causes a further reduction of 0.88 volt (40 ma. times 22 ohms, the value of the resistor 260) in the voltage on wire 288. The proximity contact 294 can now be opened without affecting the voltage on wire 288.

Similarly, the subsequent closing of the proximity contact 298 causes an additional reduction of 0.88 volt (40 ma. times 22 ohms, the value of the resistor 262) and also permits the contact 296 to open without effect.

A similar reduction of 0.88 volt on the line 288 occurs for each new closing of a proximity contact. If several proximity contacts remain closed at once, there is no change in operation. All that is required is that each proximity contact remain closed at least until the next one in line is closed.

Thus, as the car approaches a floor where a stop is to be made, the passage of the proximity contacts on the car through the energized position magnet(s) at the floor results in a large number of equal reductions in the voltage on wire 288, and, hence, in the pattern voltage at the input 154 of the circuit of FIG. 9.

After the proximity contact 312 has closed, the contacts 314, 316 and 318 operate in a manner described in the previously referred to patents. The closing of the contact 316 bypasses the resistor 276, the closing of the contact 314 bypasses the resistor 278 and the closing of the contact 318 bypasses the resistor 280 leaving only the resistor 282 which can be adjusted to obtain a suitable pattern voltage for landing speed. Finally, when the car is about ½ inch from floor level the energization of the relay for contact 320 causes the relay for contact 252 to be de-energized so that the 40 ma. constant current source is disconnected and the pattern voltage at input 154 becomes zero to call for zero speed.

For the up direction, the contact 322 on an up relay or contactor causes energization, from a negative supply line 324, of a further constant current source consisting of resistors 326 and 328, diode 330, Zener diode 332 and transistor 334. Energization of this constant current source causes the constant current to flow from ground through resistors 282, 280, 278, 276, 336, 338, 340, 342 . . . 344, 346, 348 and 350, diode 352, and resistor 256. This develops the opposite polarity on the wire 288 and hence on the pattern voltage at the output 290.

The reduction in pattern voltage as a car approaches a floor in the up direction is similar to the previously described operation for the down direction. Proximity contacts 354, 356, 358, 360, 362, 364 . . . 366, 368, 370, 372 and 374 close in sequence; then contacts 320, 314 and 318 close in sequence and finally the energization of the relay for contact 316 causes the relay for contact 322 to be de-energized so that the contact 322 opens and removes power from the constant current source to cause the pattern voltage at the output 290 to become zero.

Only the last four steps are made adjustable to allow for varying the final approach performance. For the majority of the slowdown, it is best to have equal reductions in the pattern voltage, and to vary the relationship between the pattern voltage and distance by the appropriate location of each proximity contact.

For a constant deceleration, the spacing between each pair of adjacent proximity contacts should differ by a constant amount from the next pair of adjacent proximity contacts. For example, if the proximity contacts 312 and 310 are separated by 3.0 inches, and the contacts 310 and 308 are separated by 3.3 inches, then the contacts 308 and 306 should be separated by 3.6 inches, and each succeeding dimension should increase by 0.3 inch. This results in a spacing of 10.5 inches between the contacts 296 and 294, and a total distance of 175.5 inches between the contacts 312 and 294, if there are 17 proximity contacts between 302 and 304. Such an arrangement might be suitable for an elevator installation with a speed of 600 f.p.m.

The purpose of the diodes 258 and 352 is to direct the constant current through the correct string of resistors dependent upon the direction of the current flow (which is dependent upon the direction of travel). Although a single string of resistors could have been used for both directions, the arrangement used in FIG. 10 has the advantage of simplified wiring, since the proximity contacts 356 and 294, for example, may be arranged in separate columns of proximity contacts or, if in the same column, will be a considerable distance apart.

Thus, it can be seen that the arrangement of FIG. 10 provides a slowdown pattern consisting of many small reductions in voltage, and that each additional step, if more are required, is obtainable at a cost of two more proximity contacts and two more ½ watt resistors. This system does not provide a pattern for accelerating the car; the pattern voltage jumps immediately to a high value, possibly representing full speed, at the instant that notching occurs as the car is about to leave a floor. However, the circuit of FIG. 9 does not require any acceleration pattern; it is capable of providing a smooth acceleration.

In the system described in the previously mentioned patents, Canadian Pat. No. 774,755, or the U.S. Pat. No. 3,407,905, a relay CP was used to determine when to notch. At full speed, notching occurs when the proximity contact 354 or 292 closes. During acceleration to full speed, notching may occur when a "critical position" is reached; If notching does not occur when this critical position is reached, the pattern created by the proximity contacts will commence to reduce the acceleration, and will create a pattern which will cause the car to slow down and stop at the floor at which the position magnet is energized. If no stop is desired at this floor, notching ahead to another floor must occur at or before the critical position.

If the circuit of FIG. 10 is used to create a pattern voltage, relays V3, V4, V5, V6, V7 and V8 in FIG. 3 of the previously mentioned patents are no longer available to operate the relay CP. Therefore, in FIG. 10, an additional circuit is provided to operate a relay 376, preferably a small relay such as a reed relay, which can be operated directly from an operational amplifier. A contact of the relay 376, such as contact 378 can then be used to energize the relay CP.

When no proximity contacts are closed, the constant current must flow through the resistor 256, and thus the wire 254 has a voltage greater than wire 288 by about 8.8 volts as described previously. A circuit consisting of diodes 380, 382, 384 and 386 and the Zener diode 388 introduces a voltage drop of about 5 volts, regardless of the polarity of the voltage on wire 254. Thus, a wire 390 has a voltage greater by 3.8 volts than the wire 288. It is assumed that the slider 392 of the resistor 394 is set to the same position as the slider on the resistor 284; if desired, these may be ganged so that the two are moved in unison by a single shaft. Also, it is assumed that the tachometer armature 156 shown in FIG. 10 is the same tachometer as in FIG. 9, and that the resistors 396, and 398 have the same ratio of resistances as have the resistors 164 and 158 in FIG. 9.

If so, the current through the resistor 396 will generally exceed the current through the resistor 398 while the extra 3.8 volts is present on wire 390 with the car running at full speed. However, if the proximity contact 354 or 292 closes, the voltage on wire 254 will become the same as the voltage on wire 288, thereby lowering the voltage on wire 390 by 8.8 volts to make it 5 volts lower than wire 288. The current in the resistor 398 will then exceed the current in the resistor 396.

The operational amplifier 400 has resistors 396 and 398 connected to its inverting input 402, and a resistor 404, the resistance of which equals the equivalent of 396 and 398 in parallel, connects the non-inverting input 406 to ground. No feedback resistor is used, so that the gain of the operational amplifier is a maximum. Thus the output 408 generally assumes either a high positive value or a high negative one, depending upon which of resistors 396 and 398 has the greater current. Protective diodes 410 and 412 prevent harmful voltages from appearing at the input of the amplifier 400.

For the up direction, the contact 414 is closed and one side of the coil of the relay 376 is connected to the same positive supply line 416 which supplies the amplifier 400 and the other operational amplifiers. Also, the negative constant current source is energized by the contact 322. Therefore, when all the proximity contacts are open and the current through the resistor 396 exceeds the current through the resistor 398 (which current has the opposite direction since the tachometer voltage is positive with respect to ground) the output 408 of the amplifier 400 is positive and close to the positive voltage on line 416 so that the voltage applied to the coil of the relay 376 is insufficient to close the contact 378.

However, when proximity contact 354 closes, the current through the resistor 396 decreases to less than the current through the resistor 398, and the output 408 of the amplifier 400 becomes negative. The coil 376 then has a sufficient voltage to cause the contact 378 to close.

Similarly, for the down direction, the contact 418 closes so that one side of the coil of the relay 376 is connected to the negative supply line 76 which supplies the operational amplifiers, including the amplifier 400, and the contact 252 energizes the other constant current source. When all the proximity contacts are open, the currents in the resistors 396 and 398 are such as to cause the output 408 of the amplifier 400 to become negative so that the relay 376 will not be energized. When the proximity contact 292 closes, the relay 376 is energized because the output 408 of the amplifier 400 becomes positive.

Thus, when the car is operating at full speed, each closure of a proximity contact 354 or 292 causes the contact 378 to close, thus energizing the relay CP to either cause notching, if no stop is to be made, or to signal the commencement of slowdown if a stop is to be made.

This circuit also operates during acceleration to full speed. In this case, any proximity contact which is closed by the position magnet for the next floor ahead causes the voltages on wires 254 and 288 to be essentially the same because the drain of current through the resistors 394 and 420 to ground is so small that, when flowing through the resistor 256 and some of the 260 or 350 string of resistors which are much smaller, an insignificant voltage drop occurs. Thus, the operational amplifier 400 is continuously checking the rising tachometer voltage against the decreasing pattern voltage. When these two voltages approach within about 5 volts, or whatever drop occurs in the Zener diode 388 and its associated diodes, the relay 376 is energized by the amplifier 400 to signal the need for notching if no stop is to be made.

The purpose of the Zener diode 388 is to anticipate the approach of the descending pattern voltage to the rising tachometer voltage sufficiently early to assure that notching occurs before any reduction in acceleration occurs, so that the acceleration can proceed on to full speed without slackening. If the notching occurred too late, the acceleration would begin to reduce as if a stop were required at this floor.

A small capacitor 422 can be used to render the amplifier 400 insensitive to random spikes of voltage on the wire 390 or from the tachometer armature 156.

FIG. 11 shows an alternative circuit for creating a pattern voltage. This circuit is particularly suitable for an installation whose selector system cannot provide a large number of small steps of reduction in pattern. Many conventional selectors are capable of providing only a small number of coarse steps of slowdown.

In the circuit of FIG. 11 the main shunt field on the generator has been wound in two parts, 66 and 424, so that the bridge amplifier need only supply about one-half of the total excitation. The extra field 22 is also required as before, for the measurement of flux change in the generator.

In FIG. 11 the generator field 424 is energizable from the positive supply line 72 through a resistor 426, contacts 428 and 430 or 432 and 434, through the contact 436 and through the resistor 438. For either direction, up or down, the current through this field flows through the resistor 438 in a direction such that the slider 440 develops a positive voltage, with respect to ground, which is proportional to the current through the field 424.

Adjustable taps 442, 444, 446, 448 and 450 are provided on the resistor 426 to allow for adjustment of the various levels of current, and contacts 452, 454, 456 and 458 are provided in the well known way to control the current through the field 424. During acceleration, relays 452, 454, 456 and 458 are energized in sequence, typically through timers, and during slowdown these relays drop out in the sequence 458, 456, 454 and 452 at predetermined distances from a floor. For the circuit of FIG. 11, it is best to have no timing on these relays.

The voltage developed on the slider 440 is then used as an approximate pattern voltage. Smoothing is required because of the coarseness of the steps and inversion is needed to enable reversal of the polarity of the final smoothed pattern. Although capacitive smoothing could be used, a much superior form of smoothing will now be described.

In FIG. 11, a negative smoothed pattern is developed on the output 460 of the operational amplifier 462, and the positive smoothed pattern is developed on the output 464 of the operational amplifier 466.

The principal inputs to the amplifier 467 are through the resistors 468, from slider 440, and 470 from the negative smoothed pattern. If these two inputs are exactly in agreement (that is, with the negative smoothed pattern equal to R470/R468 times the voltage on the slider 440) but of opposite polarity, the output 472 of the amplifier 467 will have a voltage of zero. The ratio R470/R468 is the ratio of resistances of the resistors 470 and 468. If these two inputs to the amplifier 467 are not in agreement, the output 472 becomes positive or negative with respect to ground; it becomes positive if the negative smoothed pattern is too great, and negative if the negative smoothed pattern is too small.

If the effect of the resistors 474 and 476 is ignored, the output 472 of the amplifier 467 will swing to the fully allowable amount, as determined by the Zener diode 478 and the diodes 480, 482, 484 and 486 for the slightest error between the two inputs.

If for example, the negative smoothed pattern voltage is too small, the output 472 of the amplifier 467 will swing to the full negative clamped value, which will be assumed to be 10 volts. This causes an integrator, consisting of the resistors 488 and 490, a capacitor 492 and the operational amplifier 466, to integrate a constant negative input which thus causes its output to become more positive at a constant rate. This output is inverted by the operational amplifier 462 so that the negative smoothed pattern becomes more negative at a constant rate. This continues until the negative smoothed pattern is in agreement with the voltage on the slider 440.

With no feedback resistor for the amplifier 467, an oscillation of small amplitude and high frequency can occur at the output 472. Therefore, a feedback resistor 476, connected between the output 472 and the inverting input 494, is used to prevent such oscillation. This resistor also causes the negative smoothed pattern to round off slightly as it nears equivalence with the voltage on the slider 440.

Thus, the purpose of the operational amplifier 467 is to detect any errors between the unsmoothed pattern on the slider 440 and the negative smoothed pattern, so that the latter can be brought into agreement with the former at an adjustable, but constant rate.

A voltage divider consisting of the resistors 496, 498 and 500 is used to adjust the rate of change of the smoothed pattern voltage and also to allow for a higher rate for decreasing the smoothed pattern than the rate for increasing it. When the output 472 of the amplifier 467 is positive, the diode 502 bypasses the resistor 496 to give a greater voltage on the slider 504; when the output of the amplifier 467 is negative, the diode 502 has no effect, and a lesser voltage exists on the slider 504. Therefore, the integrator has two different slopes: a lesser one for increasing its output, and a greater one for decreasing its output.

The purpose of this difference in operation is to allow adjustment of the slider 504 to give a suitable rate of climb of the smoothed pattern, in order to get suitable value of acceleration to full speed, without the danger that the smoothed pattern will decrease to zero so slowly that it cannot follow the steps of slowdown on the unsmoothed pattern. Ideally, during slowdown, the smoothed pattern should come briefly into agreement with each step of the unsmoothed pattern before a new step occurs. This arrangement gives excellent smoothing, with negligible delay, whereas the conventional capacitive smoothing has an appreciable delay if made equally smooth.

The purpose of the resistors 474 and 506, and the diode 508, is to allow for an adjustable amount of round off of the smoothed pattern when it approaches full speed, with no effect during slowdown. While the smoothed pattern is increasing, the voltage on the output 472 is negative, and current flows through the resistor 506 and diode 508. The negative voltage applied through the resistor 474 is added to the negative voltage applied to the resistor 470, so that the amplifier 467 begins earlier to bring its output to zero, and as it does, the voltage applied to resistor 474 decreases. This results in exponential rounding off of the smoothed pattern to its final value. The potentiometer 506 thus has an effect similar to that of the potentiometer 188 in FIG. 9. This feature provides for a smooth operation on a single floor run, where the smoothed pattern might otherwise change too abruptly from increasing to decreasing.

The only purpose of the operational amplifier 462, and resistors 510, 512 and 514, is to invert the output 464 of the integrator; such inversion is required to provide the correct polarity to feed back into the amplifier 467, and also to enable contacts 516 or 518 to connect the appropriate polarity to the resistor 30.

In FIG. 11, the tachometer armature 156 is connected differently than in FIG. 9, but it is still assumed that a positive voltage is applied to the resistor 158 for the up direction and a negative voltage for the down direction of rotation of the motor. The difference here is that the error between pattern voltage, as applied to resistor 30, and the tachometer voltage is not obtained from a separate operational amplifier such as the amplifier 162 in FIG. 9; instead, the difference between these two voltages is automatically obtained by applying them both to the operational amplifier 28. The result is the same as if the error in velocity had been applied to the amplifier 28 as in FIG. 9.

The remainder of FIG. 11 is generally similar to FIG. 9 and to FIG. 1. As in FIG. 9, a resistor 222 is shown to allow for application of a voltage $e_r$ to prevent rollback as will be explained below in connection with FIG. 13.

The voltage induced in the extra field 22, is not applied directly to resistor 234, as in FIG. 9. Instead, resistors 520 and 522 permit the attenuation of this voltage via the slider 524. This slider thus provides an adjustment similar to that of the slider 194 in FIG. 9.

An additional suicide circuit consisting of contacts 526 and 528 is provided in addition to the one using contact 232. This is a conventional suicide circuit, and can be used to assure suicide action if the regulator is disconnected. The motor can be operated at approximately half speed, if the regulator is disconnected, because of the conventional circuit which supplies the field 424.

The purpose of the resistor 530 is to provide a path to ground for the resistor 30 when the contacts 516 and 518 are both open.

Figure 12:
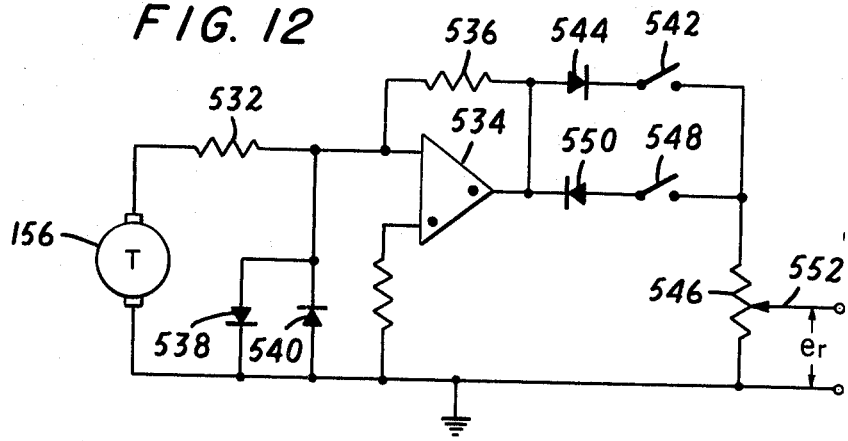
FIGS. 12 and 13 are schematic drawings of auxiliary circuits which improve the starting performance of the motor.

In FIG. 12, the voltage from the tachometer armature 156 is applied through a resistor 532 to the inverting input of an operational amplifier 534. A resistor 536 is connected as a feedback resistor from the output to the inverting input of the amplifier 534. The value of the resistor 536 is made high so that the tachometer voltage will be highly amplified. Thus, a very low speed of the motor will swing the output of the amplifier 534 to its maximum positive or negative value. For higher speeds, diodes 538 and 540 bypass the current from the resistor 532, to protect the operational amplifier.

If a run in the up direction is commencing, a contact 542 closes, and as long as the motor rotates only in the up direction, its polarity is positive with respect to ground. The output of amplifier 534 is therefore negative, and no current flows through the diode 544. However, if the motor moves in the down direction, as it might with a full load in the car, the negative voltage from the tachometer causes the output of the amplifier 534 to become positive, and forward current then flows through the diode 544, contact 542 and the resistor 546.

Similarly, if the contact 548 is closed and the motor moves in the up direction, the output of the amplifier 534 becomes negative, and current will flow from ground through the resistor 546, contact 548 and the diode 550.

The slider 552 on the resistor 546 is intended to be connected to the resistor 222 in FIG. 9. Thus, if the car moves in the wrong direction as the car is starting, a voltage $e_r$ is applied to the resistor 222 in such a direction as to make the generator flux rise at a much more rapid rate as long as such backward motion is detected. This tends to reduce significantly the rollback shown in FIG. 7.

Figure 13:
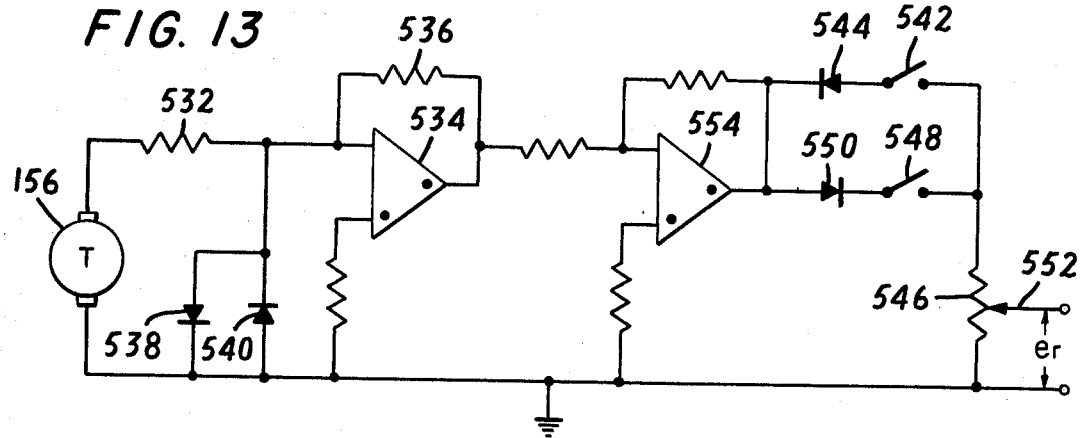

FIG. 13 shows a circuit which has the same purpose as the circuit in FIG. 12 but which is suitable for use in conjunction with the circuit of FIG. 11. A voltage of opposite polarity is required in the circuit of FIG. 11 for the resistor 222, because, although the tachometer polarity is the same as in FIG. 9, it is connected into a different part of the circuit.

Therefore, an additional operational amplifier 554 is used to invert the output of the amplifier 534, and the diodes 544 and 550 are connected with a polarity opposite to that shown in FIG. 12.

Figure 14:
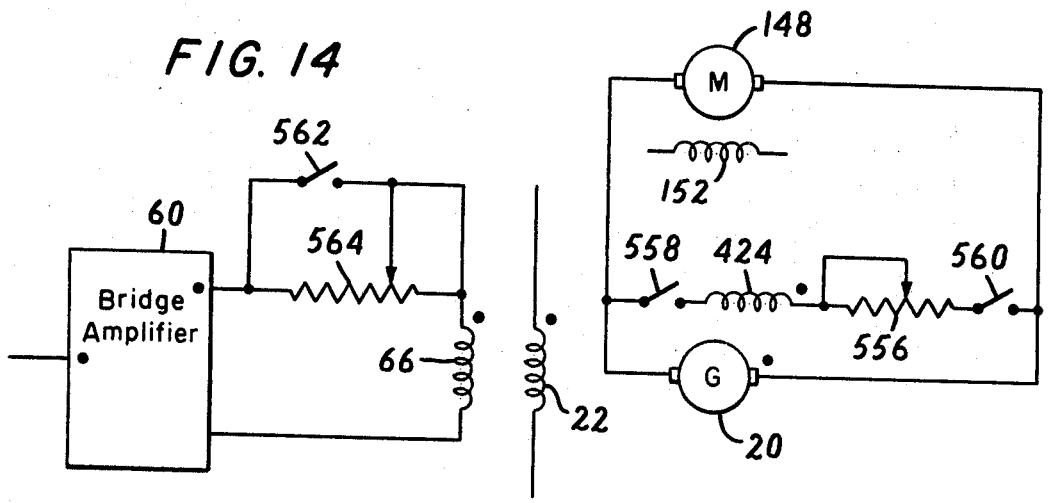
FIGS. 14 and 15 are schematic drawings showing modifications of the feedback system according to the present invention.

FIG. 14 shows several possible modifications to the circuit of FIG. 9. First, the main shunt field on the generator is wound in two parts, so that the bridge amplifier is only required to supply a portion of the total excitation via field 66 and the remainder is supplied by the self-excited field 424 through an adjustable resistor 556.

Contacts 558 and 560 can be arranged to open when the elevator doors are opened to limit the speed if the bridge amplifier fails at that time, and a further contact 562 can be arranged to open after the car has had time to come to a normal stop, or after the doors are fully open, to insert a resistance 564 in series with the field 66 for added safety.

Figure 15:
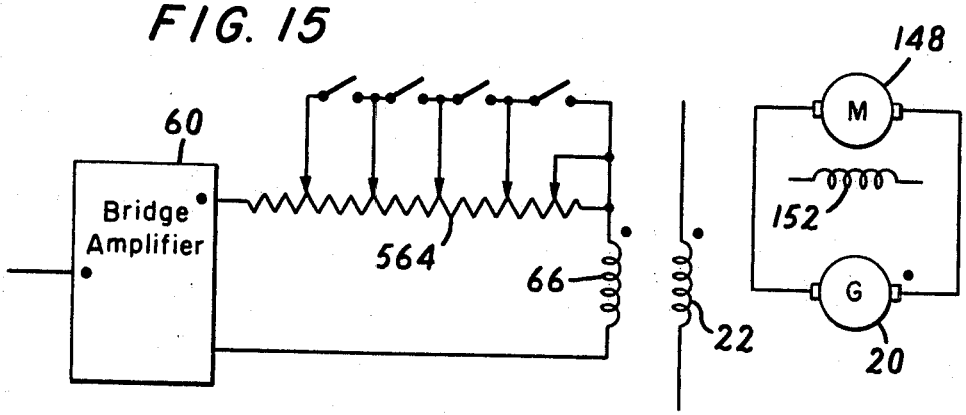

FIG. 15 shows an additional modification to the circuit of FIG. 11. Here, additional contacts of the speed relays 452–458 are used to insert more and more portions of the resistor 564 in series with the field 66 to reduce the overshoot, particularly at terminal floors, if the bridge amplifier fails.

Although a D.C. tachometer generator has been shown in many of the preceding figures, it is possible to measure the motor speed by other means. If the motor has interpoles, it is convenient to use the motor armature terminal voltage as a measure of speed, and to use the voltage drop in the interpole as a measure of the internal IR drop of the armature. The reason for using the interpole is that its temperature tends to be similar to the temperature of the armature. The temperature of an external resistor would not be the same.

Figure 16:
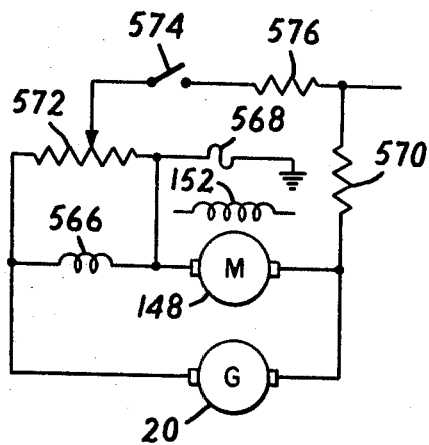
FIG. 16 is a schematic drawing showing an alternative circuit for measuring speed.

In FIG. 16, the connection between the motor armature 148 and the motor interpole 566 is grounded through a protective fuse 568. The other motor lead is used to measure the motor speed by using the resistor 570 to connect to the input of a suitable operational amplifier, such as the amplifier 162 in FIG. 9 or 28 in FIG. 11.

A potentiometer 572, connected across the interpole, allows a suitable proportion of the interpole voltage to be applied, through a contact 574 and a resistor 576 to the same operational amplifier as the voltage across the resistor 570. The combined effect of the currents in the resistors 570 and 576 is equivalent to the current from a tachometer generator.

The opening of the contact 574 results automatically in suicide action, eliminating the need for the contact 232 and the associated circuits, in the circuits of FIG. 9 or 11.

Although the present invention has been described by referring to several possible circuit configurations and embodiments, numerous variations and modifications falling within the scope and spirit of this invention, are possible. Accordingly, it is intended that the present invention be limited only by the following claims.

The embodiments of the invention in which an exclusive property or privilege is claimed are defined as follows:

1. Apparatus for controlling the speed of a D.C. motor to follow a pattern speed, said apparatus comprising, in combination:
   (a) a generator, connected to power said D.C. motor, having a first generator field;
   (b) means for producing a signal representative of the error between the pattern speed and the measured speed of said D.C. motor;
   (c) means for measuring the rate of change of flux in said generator; and
   (d) control means, connected to said signal producing means, to said measuring means and to said first generator field, for applying a voltage to said first generator field to cause the rate of change of flux in said generator to be approximately proportional to said error signal.

2. The apparatus defined in claim 1, wherein said control means includes a switching bridge amplifier for applying a prescribed voltage of alternating polarity to said first generator field.

3. The apparatus defined in claim 1, wherein said measuring means includes a second generator field, arranged in said generator and connected to said control means, for producing a voltage proportional to the rate of change of flux in said generator.

4. The apparatus defined in claim 3, wherein said control means includes means for summing at least a portion of said error signal and said voltage produced by said second generator field, and producing a signal representative of this sum.

5. The apparatus defined in claim 4, wherein said control means further includes means for integrating said sum signal and producing a signal representative of this integral.

6. The apparatus defined in claim 5, wherein said control means further includes a switching bridge amplifier for applying a prescribed voltage of alternating polarity to said first generator field.

7. The apparatus defined in claim 6, wherein said control means further includes means for switching said bridge amplifier when said integral signal reaches a predetermined positive limit and a predetermined negative limit.

8. The apparatus defined in claim 6, wherein said control means further includes means for switching said bridge amplifier when the absolute magnitude of said integral signal reaches a predetermined limit.

9. The apparatus defined in claim 1, wherein said error signal producing means includes means for clamping the amplitude of said error signal to a predetermined maximum value.

10. The apparatus defined in claim 9, wherein said predetermined maximum value of said error signal is chosen to produce full rated motor acceleration.

11. The apparatus defined in claim 1, wherein said error signal producing means includes means for adjusting the magnitude of said error signal.

12. The apparatus defined in claim 11 wherein said adjusting means is adjusted to produce full rated motor acceleration when said error signal is at a maximum.

13. The apparatus defined in claim 1,
further comprising means for detecting rotation of said D.C. motor in a direction opposite to the direction determined by said pattern speed; and
wherein said control means is responsive to said detecting means to increase said rate of change of flux in said generator to counteract said opposite rotation when said opposite rotation is detected.

14. The apparatus defined in claim 13, further comprising means for adjusting said increase in said rate of change of flux.

15. The apparatus defined in claim 14,
wherein said detecting means includes means for producing a signal when said opposite rotation is detected;
wherein said adjusting means includes means for adjusting the magnitude of said detection signal; and
wherein said control means is responsive to the adjusted detection signal to increase said rate of change of flux in said generator by an amount approximately proportional to said adjusted detection signal.

16. Apparatus for producing a signal representative of the pattern speed of a D.C. motor comprising, in combination:
(a) means for producing a signal representative of an approximate pattern speed of a D.C. motor, said approximate pattern speed signal assuming one of a plurality of first discrete voltage levels and varying between said first levels in steps; and
(b) means, responsive to said approximate pattern speed signal, for producing a smoothed pattern speed signal, said smoothed pattern speed signal assuming one of a plurality of second discrete voltage levels and varying between said second levels in ramps, said means for producing a smoothed pattern speed signal including:
  (1) means for comparing a signal proportional to said approximate pattern speed signal with a signal proportional to said smoothed pattern speed signal and producing a signal of predetermined magnitude and polarity when the compared signals are unequal; and
  (2) means responsive to said signal of predetermined magnitude and polarity, for producing a signal which is proportional to the time integral thereof.

17. The apparatus defined in claim 16, wherein each of said second levels is proportional to a respective one of said first levels.

18. The apparatus defined in claim 16, wherein said means for producing a smoothed pattern speed signal includes means for adjusting the slope of said ramps.

References Cited

UNITED STATES PATENTS 2,716,210  8/1955  Owens _____ 318—146
2,853,668  9/1958  Moore _____ 318—158

BERNARD A. GILHEANY, Primary Examiner
W. E. DUNCANSON, JR., Assistant Examiner

U.S. Cl. X.R.
318—158